United States Patent [19]

Carter et al.

[11] Patent Number: 4,825,460

[45] Date of Patent: Apr. 25, 1989

[54] LINE INTERFACE UNIT FOR CALLER-CONTROLLED RECEIPT AND DELIVERY OF VOICE MESSAGES

[75] Inventors: Howard E. Carter, Denton; Joel A. Pugh, Dallas; Byron C. Pierce, Garland, all of Tex.

[73] Assignee: MessagePhone, Inc., Dallas, Tex.

[21] Appl. No.: 209,891

[22] Filed: Jun. 22, 1988

[51] Int. Cl.4 ............... H04M 3/50; H04M 15/16
[52] U.S. Cl. .................................. 379/67; 379/69;
379/84; 379/89; 379/123; 379/143
[58] Field of Search .................... 379/67, 69, 77, 84,
379/85, 88, 89, 211, 212, 214, 123, 143

[56] References Cited

U.S. PATENT DOCUMENTS

| | | | |
|---|---|---|---|
| 3,728,486 | 4/1973 | Kraus | 379/69 |
| 3,899,645 | 8/1975 | Brofman | 379/355 |
| 4,371,752 | 2/1983 | Matthews et al. | 379/89 |
| 4,600,809 | 7/1986 | Tatsumi et al. | 379/88 |
| 4,602,129 | 7/1986 | Matthews et al. | 379/84 |
| 4,674,116 | 6/1987 | Curtin et al. | 379/211 |
| 4,696,028 | 9/1987 | Morganstein et al. | 379/88 |
| 4,766,604 | 8/1988 | Axberg | 379/67 |

FOREIGN PATENT DOCUMENTS

0166393 1/1986 European Pat. Off. .............. 379/88

OTHER PUBLICATIONS

"Busy Call Diverter", R. L. Brady et al., *IBM Technical Disclosure Bulletin*, vol. 25, No. 4, Sep. 1982, pp. 2231–2232.
"Calling or Called Number Feature for Telephone System", R. L. Brady et al., *IBM Technical Disclosure Bulletin*, vol. 25, No. 7B, Dec. 1982, pp. 3961–3962.
"Unanswered Call Diverter", R. L. Brady et al., *IBM Technical Disclosure Bulletin*, vol. 25, No. 7A, Dec. 1982, pp. 3480–3841.

*Primary Examiner*—Thomas W. Brown
*Attorney, Agent, or Firm*—David H. Judson

[57] ABSTRACT

A line interface unit for controlling receipt and delivery of voice messages over a telephone system having a voice message facility connectable to at least one calling station and a called station via a central office. The interface unit comprises a first switch connected to the calling station in the tip and ring lines and a second switch connected to the central office in the tip and ring lines, the switches having first and second positions and wherein said signals on the tip and ring lines are connected directly between the calling station and the central office when each of the switches is in the first position. In operation, a control circuit of the line interface unit responds to detection of a busy/no answer condition at the called station for switching the first switch from its first to second position to connect a speech circuit to the calling station for issuing a prompt. After the prompt is issued, the control circuit responds to receipt of a DTMF signal or additional coinage from the calling station for switching the second switch from first to second position to connect a speed-dial circuit to the central office for dialing the voice message facility. The control unit then responds to receipt of a DTMF signal from the voice message facility for switching the first and second switches from their second positions back to their first positions to connect the calling station to the voice message facility.

22 Claims, 4 Drawing Sheets

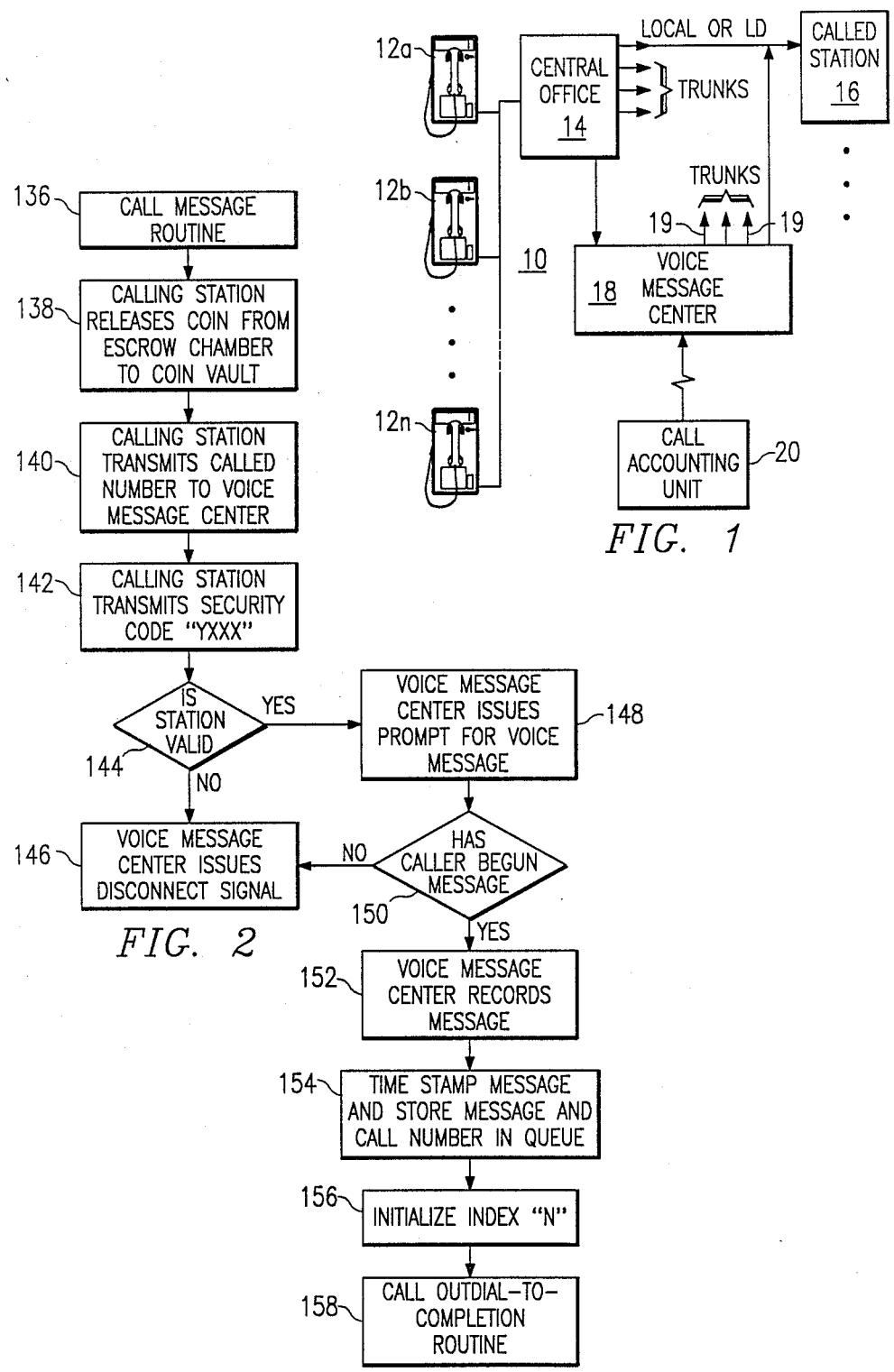

LINE INTERFACE UNIT FOR CALLER-CONTROLLED RECEIPT AND DELIVERY OF VOICE MESSAGES

TECHNICAL FIELD

The present invention relates to voice messaging methods and systems and more particularly to a line interface unit for controlling receipt and delivery of voice messages over a telephone system having a voice message facility connectible to a calling station and a called station via a central office.

BACKGROUND OF THE INVENTION

It is known in the art to operate a multiple paystation telephone installation from a central office. In such systems, the central office typically performs the coin collect, return and verification functions necessary to provide both local and long distance services. Multiple paystation installations of the type described above have recently been enhanced through the use of so called "smart" paystations. Such paystations typically include their own microprocessor and associated memory for supporting various computer programs. These programs provide several desirable operating features, e.g., loop start dialtone and "least cost routing" for long distance telephone calls. Although "smart" paystations are advantageous, such devices have yet to be successfully integrated into voice messaging systems. Paystation operators have therefore been unable to offer message storage/forwarding to users of their paystations.

It would therefore be desirable to provide a line interface unit for use in controlling receipt and delivery of voice messages in a telephone system which overcomes these and other problems of the prior art and which facilitates the providing of certain call default and message prompting operations in a standalone unit.

BRIEF SUMMARY OF THE INVENTION

A line interface unit is described for controlling receipt and delivery of voice messages over a telephone system having a voice message facility connectible to at least one (pay or non-pay) calling station and a called station via a central office, the calling station having tip and ring lines connected to the central office. The interface unit comprises a first switch connected to the calling station in the tip and ring lines and a second switch connected to the central office in the tip and ring lines, each of the switches having first and second positions and wherein signals on the tip and ring lines are connected directly between the calling station and the central office when each of the switches are in the first position. The interface unit also includes a speed-dial circuit for dialing the voice message facility, a speech circuit for issuing a predetermined prompt to the caller at the calling station, a line monitor circuit for monitoring the tip and ring lines, and a microprocessor-based control circuit connected to the line monitor circuit and the first and second switches. The line monitor includes first and second detector circuits, the first detector circuit for detecting a busy/no answer condition at the called station upon call initiation to the called station. The second detector circuit preferably detects receipt of a standard dual tone multifreguency (DTMF) signal from the calling station and receipt of a standard or non standard DTMF signal from the voice message facility.

In operation, the control circuit responds to a busy/no answer condition at the called station for switching the first switch from its first position to its second position to connect the speech circuit to the calling station for issuing the prompt. After the prompt is issued, the control circuit responds to receipt of the DTMF signal from the calling station or the input of additional coinage for switching the second switch from its first position to its second position. This switching connects the speed dial circuit to the central office for dialing the voice message facility. The control circuit then responds to receipt of the DTMF signal from the voice message facility for switching the first and second switches from their respective second positions back to their respective first positions to thereby connect the calling station to the voice message facility.

In an alternate embodiment, the calling station is a paystation. In this embodiment, the line interface unit includes a third switch connected between the ring line and ground for generating a ground start after the voice message facility has been dialed by the speed dial circuit. This operation enables the interface unit to complete a connection to the voice message facility through the central office without the caller having to deposit additional coinage. After the ground start, the control circuit is responsive to receipt of the DTMF signal from the voice message facility for switching the first and second switches from their respective second positions back to their respective first positions to thereby connect the calling paystation to the voice message facility. If the caller does not desire to leave a voice message, however, the line interface unit causes the central office to generate a "coin return" signal to return the caller's coinage.

In yet another embodiment, the line interface unit provides a so called "voice over" operation wherein the caller at the calling station is allowed to continue to monitor the call progress (i.e., the ringing on the line) while being prompted to leave a message. In this embodiment, the control circuit is responsive to predetermined condition at the called station for switching the first and second switches from their respective first positions to their respective second positions. This operation connects the speech circuit to the calling station for issuing the prompt while simultaneously enabling the caller at the calling station to continue to monitor the progress of the call. After the prompt is issued, the control circuit is responsive to receipt of a DTMF signal from the calling station for switching the second switch from its second position to its first position and then back to its second position. This operation reorders dialtone to the interface unit and then connects the speed dial circuit to the central office for dialing the voice message facility. After dialing the voice message facility, the control circuit is responsive to receipt of the DTMF signal from the voice message facility for switching the first and second switches from their respective second positions back to their respective first positions and thereby connect the calling station to the voice message facility.

BRIEF DESCRIPTION OF THE DRAWINGS

For a more complete understanding of the present invention and the advantages thereof, reference is now made to the following description taken in conjunction with the accompanying drawings in which:

FIG. 1 is a block diagram of a multiple user station telephone system having a central office and a voice message facility;

FIG. 2 is a detailed flowchart diagram of a call routine of a voice message storage/forward method for use in a paystation system to determine whether a call can be completed from a calling station to a called station;

DETAILED DESCRIPTION

Figure 3:
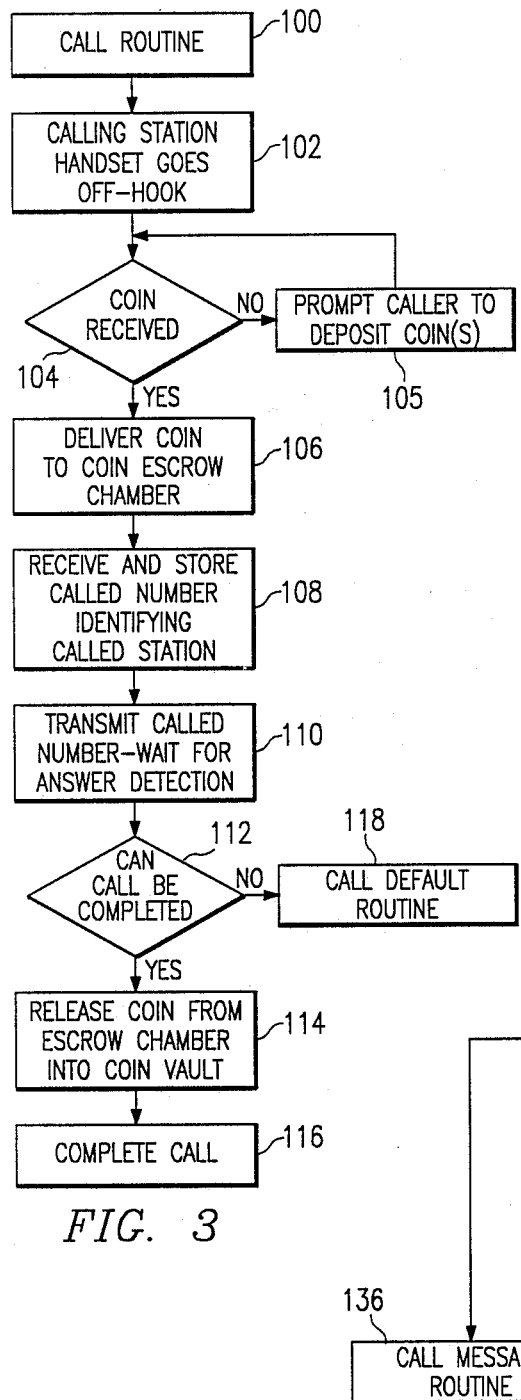
FIG. 3 is a detailed flowchart diagram of a call default routine of FIG. 2 for determining whether a caller desires to leave a voice message to be forwarded to the called station.

FIG. 1 is a block digram of a multiple user station telephone system 10 in which a voice message storage and forwarding method has been implemented according to the teachings of U.S. Pat. No. 4,766,604, assigned to the assignee of the present application. System 10 includes a plurality of user stations 12a–12n connected to a conventional or private owned central office 14. Each of the user stations 12a–12n is preferably a "pre pay" paystation, such as a Model 1200-2 manufactured by Elcotel, Inc., and thus includes a suitable microprocessor and associated memory device (e.g., a programmable read only memory or "PROM") for storing computer programs which control the operation of the paystation. Each paystation also includes a conventional handset 15 as well as other standard components (not shown) normally associated with the coin collection process.

To initiate a call from one of the paystations 12a–12n, a caller removes the handset 15 and enters a called number. This number identifies a called station 16 which may be either a local or a long distance station. As also seen in FIG. 1, the multiple paystation system 10 includes a voice message facility 18 connected to the central office 14 for recording voice messages from the user stations 12a–12n. Voice message facility 18 has a plurality of access ports 19 from which recorded voice messages are output. The system 10 may also include a call accounting unit 20 connected to the voice message facility 18 for the purposes to be described.

Multiple user station systems such as shown in FIG. 1 as well as other telephone systems having non pay calling stations have been enhanced by the method for receiving the delivering voice messages described in U.S. Pat. No. 4,766,604. The method exploits the inability of a calling station 12a–12n to complete a call to the called station 16 to automatically cause the called station to default to the voice message facility 18. If the caller desires to leave a voice message to be delivered to the called station 16, the caller is thereafter prompted to store the voice message. The voice message facility 18 then initiates an outdial routine which makes a predetermined number of attempts to forward the voice message to the called station. Each of these attempts are typically made at a predetermined time interval programmed by the system operator.

Referring now to FIG. 2, a flowchart diagram is shown detailing a call routine 100 of the method for receiving and delivering voice messages in a paystation embodiment as described in U.S. Pat. No. 4,766,604. The call routine 100 begins at step 102 when the calling station handset 15 goes off hook. As described in that application, each calling station 12a–12n is preferably a "pre pay" paystation which requires receipt of appropriate coinage before a call can be placed. Accordingly, at step 104, an inquiry is made to determine whether a coin has been received. If not, the method continues at step 105 to request that the caller deposit the appropriate coinage for the call. Upon receipt of the coinage, the method continues at step 106 to deliver the coin to a conventional coin escrow chamber of the calling station.

At step 108, the method receives and stores the called number identifying the called station 16. At step 110, the called number is transmitted over the trunk and the calling station waits for an answer detection (i.e., the called station goes off-hook). The method continues at step 112, where an inquiry is made to determine whether the call can be completed. In particular, step 112 preferably determines whether answer detection occurs within a predetermined number of rings or whether the called station is busy. If the call can be completed, the method continues at step 114 to release the coin from the coin escrow chamber into the coin vault of the calling station. At step 116, the call is completed in a normal fashion. If the result of the inquiry at step 112 indicates that answer detection has not occurred (i.e., the called station remains on hook) within the predetermined number of rings following call initiation or that the called station is busy, the method initiates a "call default" routine 118 for determining whether the caller at the calling station desires to leave a voice message to be delivered to the called station.

Referring now to FIG. 3, a detailed flowchart diagram is shown of the call default routine 118 of FIG. 2. The routine begins at step 120 wherein the calling station issues a prompt to the caller such as "Please Wait" or "One Moment Please". A bilingual prompt may also be issued at step 120 if desired. At step 122, the handset of the calling station is disabled. The call default routine 118 continues at step 124 wherein the original call is disconnected from the trunk and a "speed dial" is initiated to the voice message facility 18. The muting of the handset at step 122 is advantageous because step 124 disconnects the original call from the trunk. If the handset were not muted the caller would otherwise hear a dialtone and the voice message facility 18 could be accessed via a "black box" or other illegal means.

The call default routine 118 continuous at step 126 with the handset of the calling station reactivated upon receipt of a predetermined signal, e.g., a DTMF (dual tone multifreguency) signal identifying the "#" key, from the voice message facility. At step 128, the voice message center issues a prompt to the caller and waits for an appropriate response. Although not meant to be limiting, the following prompt is issued at step 128:

"This is a voice message center. Your party is not available at this time. If you would like to leave a 20 second message at no additional charge, press the "#" key and I will attempt to deliver your message every 15 minutes for the next two hours. If you do not wish to leave a message, hang up, and I will return your money."

The call default routine 118 continues at step 130 to determine whether the caller desires to leave a voice message for the called station. In operation, step 130 waits for reception of a DTMF signal identifying the "#" key within a set period of time, e.g., 15–20 seconds.

If the timer at step 130 times out (indicating that the caller does not wish to leave a voice message) the call default routine 118 continues at step 132 with the voice message facility 18 sending a "disable" signal to the calling station. At step 134 in the paystation embodiment, the coin located in the coin escrow chamber is released to a coin return chute of the calling station and the call is terminated. If the result of the inquiry 130 is positive, the method continues by calling a "call message" routine 136 for storing the voice message to be delivered to the called station.

Figure 4:
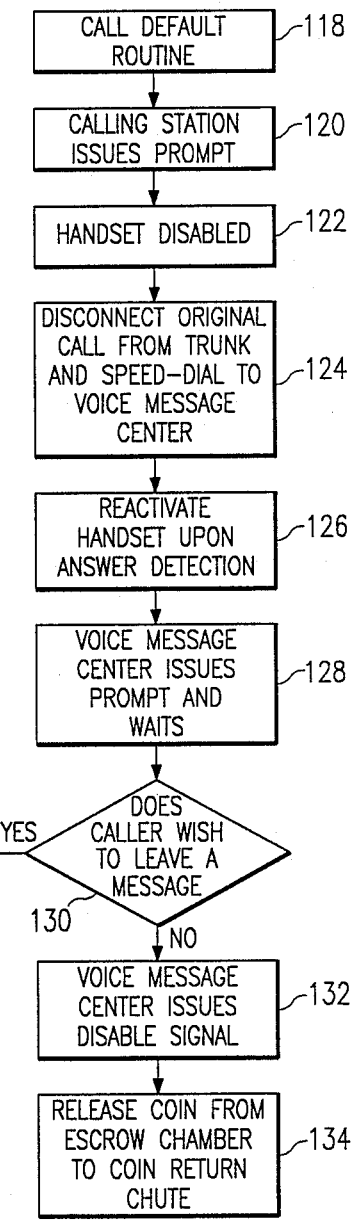
FIG. 4 is a detailed flowchart diagram of a call message routine of FIG. 3 for storing the voice message to be forwarded to the called station.

Referring now to FIG. 4, a detailed flowchart diagram is shown of the call message routine 136 of FIG. 3. The routine begins at step 138 wherein, in the paystation embodiment, the calling station releases the coin from the coin escrow chamber into the coin vault of the calling station. At step 140, the calling station transmits the called number to the voice message facility 18. The call message routine 136 continues at step 142 wherein the calling station transmits a preferably four digit security code "YXXX" to ensure that the calling station is entitled to transmit messages to the voice message facility. Preferably, the first digit "Y" of the security code is a DTMF combination of a dialtone and the "#" key. The remaining three digits "XXX" of the security code are preferably a number which uniquely identifies the calling station.

At step 144, the received security code is evaluated to determine whether the calling station is entitled to transmit messages to the voice message facility 18. If the calling station is invalid, the call message routine 136 issues a disconnect signal to the calling station at step 146, thereby disconnecting the calling station from the voice message facility 18. If the result of the inquiry 144 indicates that the calling station is valid, the voice message facility 18 issues a prompt at step 148 to request that the caller begin the message. For example, the prompt at step 148 may state:

"Please state your name and your 20 second message now."

At step 150, an inquiry is made to determine whether the caller has begun recording the message within a predetermined time, e.g., 5 seconds. If the caller has not begun recording the message within the predetermined time, the call message routine 136 issues a salutation and then generates a disconnect signal at step 146.

If the result of the inquiry at step 150 is positive, the voice message facility 18 records the spoken message at step 152. At step 154, the call message routine 136 time stamps the message and stores the message and the called number transmitted at step 140 in a call.queue. As used herein, the phrase "time stamps" mean that the message and the called number are placed in the call queue (i.e., a suitable memory device of the voice message center) at an address uniquely associated with the time that the caller began recording the message. At step 156, an index "N" for the message is initialized. The index "N" represents a number of outdial attempts to be performed by the voice message center 18 as will be described. The call message routine 136 terminates at step 158 by calling an "outdial to completion" routine which is used to attempt delivery of the stored voice message to the called station.

The outdial-to completion routine attempts to forward each stored message at a predetermined time interval (and multiples thereof) from the time the message is stored in the call queue. The message may be forwarded redundantly to insure delivery to the calling party. Alternatively, the message is forwarded once after a short time delay (e.g., 2-3 seconds) to insure that the calling party is attentive prior to delivery.

Figure 5:
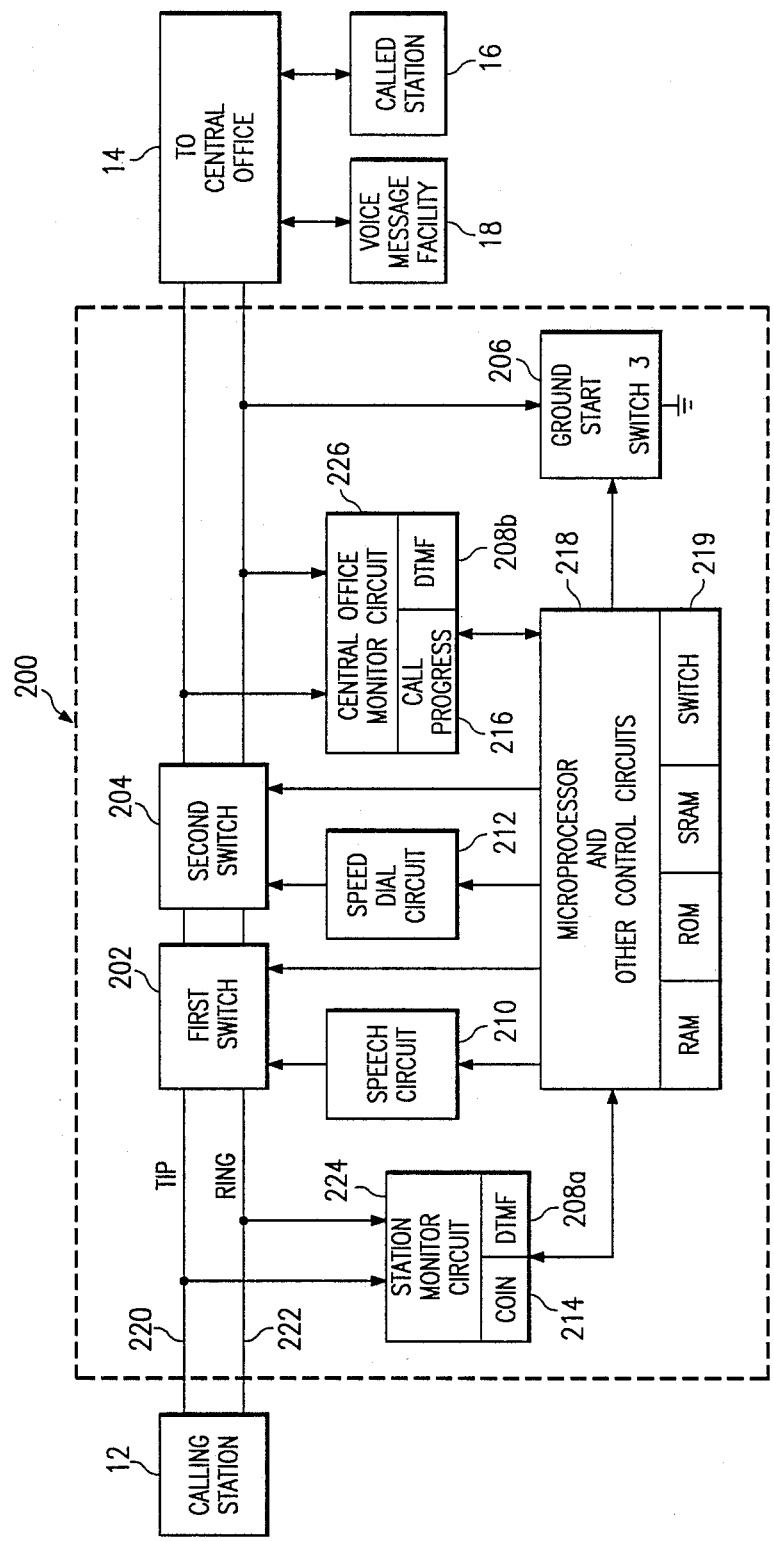
FIG. 5 is a simplified block diagram of a line interface unit according to the present invention.

While the invention described in U.S. Pat. No. 4,766,604 has proven satisfactory, it has been found desirable to provide certain enhancements and improvements to the voice messaging method described therein. Referring now to FIG. 5, which is a modification of the arrangement of FIG. 1, a line interface unit 200 is shown for providing enhanced control of receipt and delivery of voice messages over a telephone system having a voice message facility 18 connectible to at least one calling station 12 and a called station 16 via a central office 14. As will be described, the line interface unit 200 advantageously provides certain call default and message prompting operations in a standalone unit both externally to the calling station 12 and the voice message facility 18. The interface unit may be located adjacent to the calling station or on the input side of the central office switching equipment.

As seen in FIG. 5, the line interface unit 200 comprises a plurality of functional modules including first, second and third switches 202, 204 and 206, respectively, DTMF detector circuits 208a and 208b, a speech circuit 210, a speed dial circuit 212, a coin detect circuit 214, a call progress detector circuit 216, a control circuit 218, a calling station monitor circuit 224 and a central office monitor circuit 226. The control circuit 218 is preferably a microprocessor based controller having suitable control programs for effecting the operations described below. The control circuit 218 is connected to control the first, second and third switches 202, 204 and 26, as well as the speech circuit 210 and the speed dial circuit 212. The speech circuit 210, the speed-dial circuit 212 and/or the control circuit 218 may be shared by a plurality of line interface units each having the disclosed switching and monitoring components.

In the preferred embodiment of the invention, each of the first and second switches are a double-pole, double throw switch located in the tip and ring lines 220 and 222 between the calling station 12 and the central office 14. In particular, the first switch 202 is connected to the calling station 12 in the tip and ring lines 220 and 222 and the second switch 204 is connected to the central office 14 in the tip and ring lines. Each of the switches 202 and 204 have first and second positions such that signals on the tip and ring lines 220 and 222 are connected directly between the calling station 12 and the central office 14 when each of these switches are in the first position. The unit is thus "idle" when the switch contacts of the first and second switches 202 and 204 are in their first position. However, the line interface unit 200 communicates directly with the calling station 12 when the first switch 202 is switched from its first position to its second position. Likewise, the line interface unit communicates directly with the central office 14 when the second switch 204 is switched from its first position to its second position. The unit 200 thus communicates with both the calling station 12 and the central office 14 when the switch contacts of switches 202 and 204 are activated to the second positions. When both switches are in their second position, a small amount of crosstalk between the switches 202 and 204 exists and is advantageously used by the interface unit 200 for the purposes described below. Because of the placement of the switches 202 and 204 in the tip and ring lines 220 and 222, it should be appreciated that switching of the first switch 202 from its first position to its second position causes the handset of the calling station to be disconnected from the central office 14. Likewise, switching of the second switch 204 between its first and second positions automatically disconnects the calling station from the central office 14 and reorders dialtone to the line interface unit 200.

As noted above, the line interface unit 200 also includes the speech circuit 210 for issuing one or more predetermined (English or bilingual) prompts to the caller at the calling station 12. For example, the speech circuit is controlled by the control circuit 218 to issue a prompt to determine whether the caller at the calling station desires to leave a voice message for a called station. If the caller desires to leave a voice message, the control circuit 218 operates to control the speed dial circuit 212 for speed-dialing the voice message facility 18. The control of this operation is effected through sensing of various signals by the line monitor circuits 224 and 226.

In particular, the calling station monitor 224 is connected across the tip and ring lines 220 and 222 adjacent the calling station side of the unit 200. Likewise, the central office monitor circuit 226 is connected across the tip and ring lines adjacent the central office side of the interface unit 200. The calling station monitor 224 monitors the tip and ring lines for coin detect signals (which are processed by the coin detect circuit 214) or receipt of a predetermined DTMF signal (e.g., a "#" key) from the calling station (which is processed by the DTMF detector circuit 208a). The central office station monitor 226 monitors the tip and ring lines for detecting a predetermined condition at the called station (e.g., a busy/no answer condition) upon call initiation to the called station. Central office monitor circuit 226 also monitors the tip and ring lines for detecting receipt of standard or non standard DTMF signaling which is then processed by the DTMF detected circuit 208b. The control circuit 218 includes a switch 219 for selectively switching the outputs of the DTMF detector circuits 208a and 208b to the control circuit 218.

Although not meant to be limiting, preferably the DTMF detector circuit 208a senses receipt (over the calling station monitor 224) of a standard DTMF signal indicating that the caller at the calling station desires to leave a voice message for the called station. Alternatively, the caller can deposit additional coinage or pull a credit card through a cardreader to indicate his/her intention to record a voice message at his or her expense. The calling party thus controls the message storage (by entering a predetermined code following the message prompt) and is responsible for paying for the message forwarding attempts. Call accounting unit 20 as shown in FIG. 1 advantageously monitors and records all such message storage and forwarding activities for each calling station to enable the system operator to directly bill the calling station for the service. The DTMF detector circuit 208b senses receipt (over the central office monitor 226) of a non standard DTMF signal from the voice message facility following the speed-dialing thereto as will be described in more detail below.

The third switch 206 of the line interface unit is connected between the ring line 222 and ground for the purpose of generating a ground start after the speed dial circuit 212 has speed dialed the voice message facility. This ground start is required to enable the interface unit 200 to complete a connection to the voice message facility 18 through the central office without the caller having to deposit additional coinage in the paystation. As also seen in FIG. 5, the line interface unit 200 includes the coin detect circuit 214 for detecting receipt of coinage in the paystation. Coin detect circuit 214 is preferably coupled to the control circuit 218 to provide a running total of all coins deposited in the calling station over a predetermined time. Moreover, the control circuit 218 can be remotely reprogrammed (e.g., to change the prompt, the language of the prompt, the calling station identification or the number of unanswered rings at the called station which will initiate a call default) through DTMF signaling from a host or handset. To effect reprogramming, the second switch 204 is switched to its second position and the parameter information is down loaded to the microprocessor.

In operation, the control circuit 218 responds to a busy/no answer condition at the called station (following call initiation thereto) for switching the first switch 202 from its first position to its second position. This operation disconnects the calling station handset from the central office and connects the speech circuit 210 to the calling station 12 for issuing the prompt to determine if the caller desires to leave a voice message. After the prompt is issued, the calling station monitor circuit 224 waits for receipt of the DTMF signal from the calling station (or, alternatively, waits for receipt of additional coinage). If no DTMF signal is received (i.e., if the caller does not desire to leave a voice message), the unit 200 remains idle. However, upon detection of the DTMF signal by the DTMF detector circuit 208a (or the detection of additional coinage by coin detector 214 as the case may be), the control circuit 218 responds by switching the second switch 204 from its first position to its second position. This switching reorders dialtone and connects the speed dial circuit 212 to the central office 14 for dialing the voice message facility 18. The central office monitor circuit 22 then waits for receipt of the DTMF signal from the voice message facility. The control circuit 218 then responds to detection of the DTMF signal by the DTMF detector circuit 208b for effecting a "handshake" to the voice message facility and then switching the first and second switches 202 and 204 from their respective second positions back to their respective first positions to thereby connect the calling station 12 to the voice message facility 18.

As noted above, when the calling station 12 is a paystation, the line interface unit 200 must present a ground start to the central office 14 in order to dial the voice message facility 18 without additional coinage. To this end, the control circuit 218 operates to activate the third switch 206 connected between the ring line 222 and ground for generating a ground start after the voice message facility 18 has been dialed by the speed dial circuit 212. This ground start is typically performed immediately after the last digit of the voice message facility is dialed by the speed-dial circuit and enables the interface unit to complete a connection to the message facility without the caller having to deposit additional coinage. After the ground start, the control circuit 218 is responsive to receipt of the preferably non standard DTMF signal from the voice message facility 18 for switching the first and second switches from their respective second positions back to their respective first positions. This operation connects the calling paystation to the voice message facility. The use of non standard DTMF signaling increases security of the transmissions between the calling station and the voice message facility.

In the paystation embodiment, it should be appreciated that switching of the first switch 202 to the second position (e.g., in response to a busy/no answer condition at the called station) causes the central office 14 to issue a 130V "coin return" signal to the paystation. This signal, however, cannot reach the calling station because the first switch is in the second position. Accordingly, when the caller at the calling station does not desire to leave a voice message for the called station, the line interface unit 200 must cause the central office to issue another "coin return" signal. Otherwise, the caller will not obtain his/her coinage back from the paystation. This "coin return" operation is achieved according to the invention when the caller goes "on hook" (indicating that the caller does not desire to leave a voice message). In particular, at that time the control circuit 218 switches the second switch 204 to its second position to reorder dialtone from the central office 14. Thereafter, the first switch 202 is switched back to its first position. After the central office monitor circuit 226 senses dialtone, the control circuit 218 switches the second switch back to its first position. To the central office 14 this operation emulates the calling station going off hook and then on hook. The central office 14 thus again issues a "coin return" signal; however, this signal is not passed through the "idle" line interface unit to the calling station. The caller's original coinage is then returned.

Figure 6:
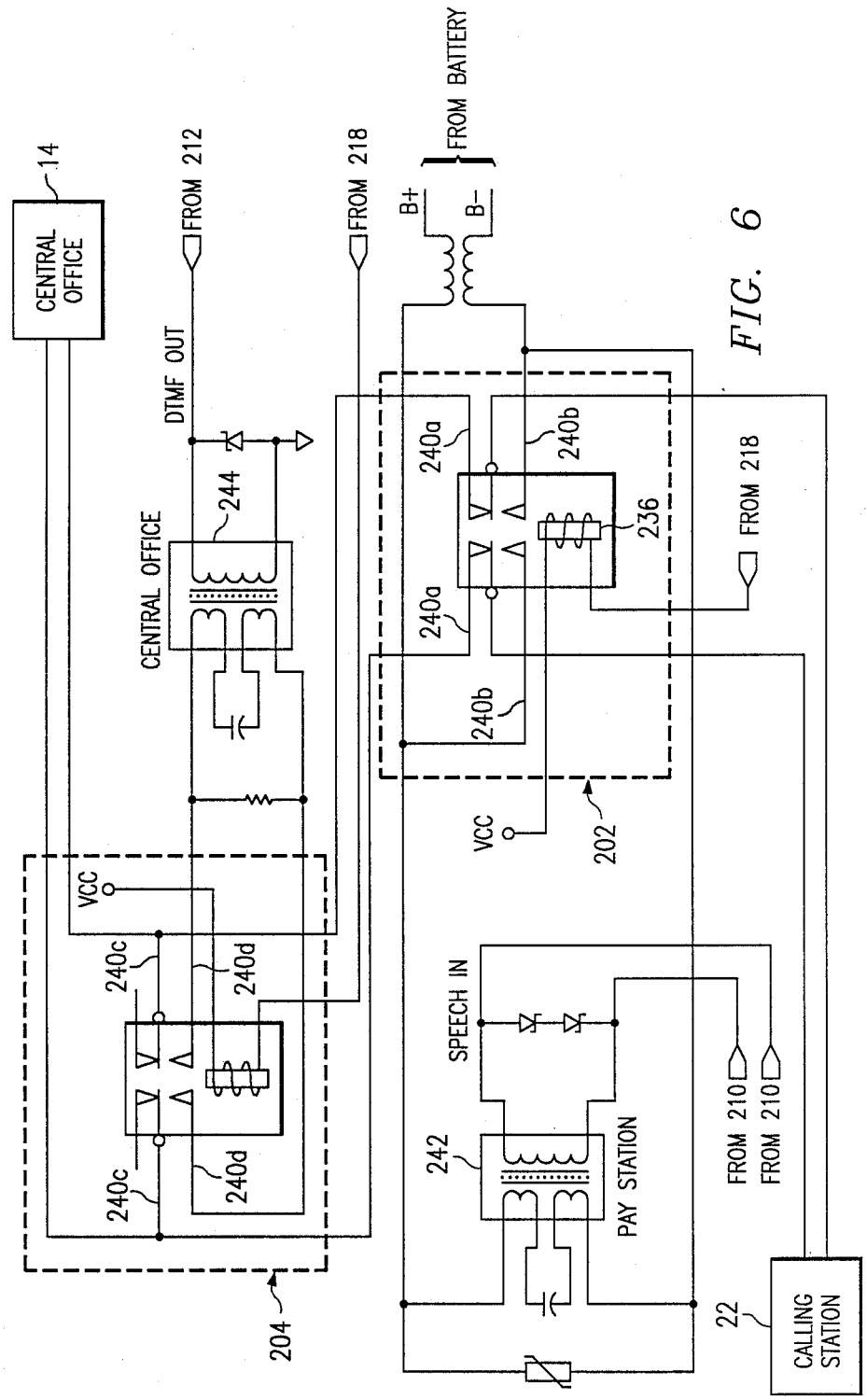
FIG. 6 is a detailed schematic diagram of the first and second switch means of FIG. 5.

In yet another embodiment, the line interface unit provides a so-called "voice over" operation wherein the caller at the calling station 12 is allowed to continue to monitor the call progress (i.e., the ringing on the line) while being prompted to leave a message. In this embodiment, the control circuit 218 is responsive to a predetermined condition at the called station (e.g., three (3) rings with no answer) for switching the first and second switches from their respective first positions to their respective second positions. This operation connects he speech circuit 210 to the calling station 12 for issuing the prompt while simultaneously enabling the caller at the calling station to continue to monitor the progress of the call. This operation is effected by the crosstalk between the first and second switch transformers as best seen in FIG. 6, which is a detailed schematic diagram of the switches 202 and 204. In particular, first switch 202 includes a control relay 236 controlled by the control circuit 218 for switching the switch between the sets 240a and 240b of switch contacts. When the switch is in the second position (across contacts 240b), the speech circuit 210 is coupled to the calling station via the line transformer 242. Likewise, when the second switch is in its second position (across contacts 240d), the speed-dial circuit 212 is coupled to the central office and thus the voice message facility via the line transformer 244. Crosstalk between the line transformers 242 and 244 enables the voice-over operation to be effected.

After the prompt is issued during the voice-over operation, the control circuit 218 is responsive to receipt of a DTMF signal from the calling station 12 for switching the second switch from its second position to its first position and then back to its second position. This operation reorders dialtone to the interface unit 200 and then connects the speed dial circuit 212 to the central office for dialing the voice message facility 18. After dialing the voice message facility, the control circuit is responsive to receipt of the DTMF signal from the voice message facility for switching the first and second switches from their respective second positions back to their respective first positions and thereby connect the calling station to the voice message facility.

Before the first and second switches are returned to their first position to connect the calling station to the voice message facility, the line interface unit 200 performs a "handshake" with the voice message facility 18. In particular, the control circuit 218 transmits a predetermined data string to the voice message facility 18. Preferably, this data string has the following format—"#", "#", (10 digit number of calling station, "#", (1-digit activity code), "#", (called station number), "#"—. The data string may also include a credit card number. The "#" sign delimits the fields of the data string. The activity code informs the voice message facility 18 or other host that an alternative prompt has been made (e.g., a bilingual prompt). One of more of the "#" signs may alternatively be non-standard DTMF signaling for increased security. When the voice message facility receives the data string, it transmits an "acknowledge" signal (e.g., an "*") back to the unit or requests retransmission if the data has not been received. Upon receipt of the acknowledge signal, the control circuit 218 switches the first and second switches back to their respective first positions.

While in the preferred embodiment the line interface unit 200 is adapted for use with a single calling station, a plurality of calling stations may be selectively switched to a single interface unit. Moreover, although not discussed in detail, it should be appreciated that other forms of signaling may be used in the invention. For example, the control circuit 218 may include appropriate circuitry for processing FSK signaling if desired. Further, the control circuit 218 of the line interface unit 200 may alternatively include appropriate software to perform automatic number identification ("ANI") following the caller's affirmative decision to leave a voice message. This ANI function is advantageous when the calling station and the called station are intra-lata.

The following is a source code listing of a preferred control program for controlling the control circuit microprocessor to carry out the functions described above:

```
.BEGIN
---------------------------------------------------------------.

;==========================================================,
;     SYSTEM EQUATES:
;        PORT 2 MASK VALUES
```

```
LSENSE          .EQU %40            ;Detect Off-Hook mask value.
DVREAD          .EQU %80          ;DTMF Write Strobe.
POUND           .EQU %0E          ;Pound-Button mask value; "False".
STAR     .EQU %0C         ;Star-Button mask value; "True".
DLBIT           .EQU %20          ;Default Language Test Bit. (0=swap)
;    PORT 3 MASK VALUES
SPBUSY          .EQU %04          ;OKI Speech progress signal.
TONEVAL         .EQU %08          ;Detect Dialtone mask value.
RINGVAL  .EQU %10                 ;Detect Ring/Count mask value.
BUSYVAL         .EQU %20          ;Detect Busy signal mask value.
COINZ           .EQU %40          ;Coin-Tone Signal mask value.
;    PORT 4 MASK VALUES
K1       .EQU %01        ;Relay bit-address on Port 4.
K2       .EQU %02        ;  "    "     "      "    "
K3       .EQU %04        ;  "    "     "      "    "
K4       .EQU %08        ;  "    "     "      "    "
STATUS          .EQU %40           ;STATUS LED (Watchdog pulse)
FAIL     .EQU %80        ;DTMF COMM Failure LED
;    PORT 4X -(SPEECH)
OKSTART         .EQU %80          ;Oki start bit address at Port 4.
LANG0           .EQU %00          ;Language 0 (Default) 2/8 DTMF value.
LANG1           .EQU %01          ;Language 1 (Alternate) 2/8 DTMF value.
;    WORKING REGISTER (RP0) EQUATES
PTIME           .EQU R3           ;Time-constant /multiplier value.
PERIOD          .EQU R10          ;Period Register.
SECOND          .EQU R11          ;Seconds Register.
WORKREG         .EQU R12          ;Dedicated G.P. Working Register.
STWORD          .EQU R13          ;Sample reg./Data window.
DATAVD          .EQU R14          ;DTMF signal register.
SYSTEM          .EQU R15          ;Event counter register.
;    GENERAL REGISTER EQUATES
LANG     .EQU %3C         ;r60: Holds User-Selected Language.
REPORT          .EQU %3D          ;r61: Holds MIU Condition Indicator.
ERRCNT          .EQU %3E          ;r62: Consecutive DTMF error count.
CELL4           .EQU %3F          ;r63:Mirror memory for PORT 4.

RBC      .EQU %50         ;r80: Ring-Back EOC.     DEFAULT =(5)
INRC     .EQU %51         ;r81: In-rings EOC.      =(3)
BIMODE          .EQU %52          ;r82: Bi-Lingual FLAG.         =(0)
ALTERN          .EQU %53          ;r83: 2nd Alt host FLAG. =(0)
AMT             .EQU %54          ;r84: Coin-tones EOC.          =(5)
BLNKREG1 .EQU %55         ;r85: Unused            =(0)
BLNKREG2 .EQU %56         ;r86: Unused            =(0)
DIGLIM          .EQU %5A          ;r90: General EOC: (^1b, RRx)
GENFLG          .EQU %5B          ;r91: General-Purpose Accum/Reg.
POLICE          .EQU %5C          ;r92: General loop-count monitor.
GSTFLG          .EQU %5D          ;r93: 1-Second delay loop variable.
LDSECS          .EQU %5E          ;r94: Timer Flag for L.D. Linesense.
INTRET          .EQU %0020            ;IRET SPRINGBOARD VECTOR.

.ORG %0020          ;MIU ROM START
START0:  JP    START1
MS0:     .ASCII    ' REL 1-18-1988       '
MS1:     .ASCII  ' MIU FEILD-PROGRAMMABLE RAM VER. 2.17 '
MS2:     .ASCII    '   CANADA BELL    Field Test Rom  '
MS3:          .ASCII  ' ALL RIGHTS RESERVED '
MS4:          .ASCII    ' By Gary R. Melander '
MS5:          .ASCII    ' COMPLIANCE TECHNICAL ASSISTANCE GROUP '

START1:  EI             ;begin
    DI
    SB0            ;select register bank 0
    LD   EMT,#00000000B ;external memory timing=no wait input, normal
                   ;memory timing, no wait states, stack internal,
                   ;and DMA internal.
```

```
        LD      P0,#00H          ;address begins at 0000h, set upper byte.
        LD      P0M,#11111111B   ;select all lines as address.
        LD      PM,#00110000B    ;enable port 0 as upper 8 bits address.
        LD      H1C,#00000000B   ;handshake not enabled port 0.
;
        LD      RP0,#0C0H   ;Set working register low to lower 8 bytes
        LD      RP1,#0C8H   ;Set working register high to upper 8 bytes
        LD      SPL,#0FFH   ;Set stack pointer to start at top of set #2.
                            ;note here that only lower 8 bits are used
                            ;for stack pointer.  SPH is general purpose
                            ;storage when stack is used internal to the S8.
        LD      SPH,#0FFH   ;Using the otherwise wasetd SPH as a WWR.
ZERO:   CLR     @SPH         ;Zero it, from top down...
        DEC     SPH
        JR      nz,ZERO      ;until register set is all zeroed
        CLR     @SPH         ;and the last one as well.

SRP     #00
            LDW     RR6, #VIRGIN         ;Check for previous powerup pattern.
        LDE     R0, @RR6
        CP      R0, #%CA
        JR      EQ, RESTART  ;JUMP OVER NEXT INSTRUCTIONS IF THIS
;                            ;IS A WARMSTART...
        CLR     ERRCNT               ;RESET DTMF ERROR FLAG ONCE AT POWERUP.
DATAMOV:SRP     #%00                 ;BEGIN LOADING EPROM RESIDENT DATABASE
        LDW     RR8, #ZCESYS         ;(FIRST DATA BYTE ADDRESS)
        LDW     RR6,    #%B000       ;TO NEW HOME IN BATTERY BACKED RAM.

LOADLP0:LDE     SYSTEM,   @RR8       ;THIS ROUTINE IS FOR INITIALLIZATION
        LDE     @RR6,     SYSTEM         ;ONLY UPON COLDSTART.;
        INCW    RR6
        INCW    RR8
        CP      R7,  #%FF
        JR      NE,  LOADLP0

RESTART:EI                           ;SECOND START AFTER INITIALLIZATION.
        DI                   ;Toggle interrupts off.
        LD      SPH, #%00    ;SET AT BOTTOM OF MONITOR STACK WHEN
        LD      SPL, #%FF    ;USING THE DEVELOPMENT KIT!
        NOP                  ;Internal addressing only for next
        NOP                  ;few machine-cycles. Keep it non-
        NOP                  ;critical to allow settling time.
        NOP                  ;
        CLR     ERRCNT               ;Jump over Error counter.
TROUBLE:INC     ERRCNT
        CP      ERRCNT,#%03          ;INCORRECT QUITS ARE RECORDED AND A
        JP      EQ,OFFLINE           ;SHUTDOWN OCCURS ON 2 DTMF FAILURES.

VARSET: SRP     #%50                 ;Reload internal registers.
        LDW     RR8,#REGRAM1
        LDE     R0,@RR8      ;from battery-backed RAM, in case of
        INCW    RR8
        LDE     R1,@RR8      ;power-down after field programming.
        INCW    RR8
        LDE     R2,@RR8      ;...Load to internal register set.
        INCW    RR8
        LDE     R3,@RR8      ;
        INCW    RR8
        LDE     R4,@RR8      ;
        INCW    RR8
        LDE     R5,@RR8
        INCW    RR8
        LDE     R6,@RR8
```

```
SETWWR: SRP     #%00                    ;Set Working Registers to First Row.

INITALL:CALL    P2IN                    ;Set up PORT 2 as default input.
        LD      P4D, #0                 ;Set up PORT 4 as output only, TTL
        LD      P4, #%40                ;levels, no HSHK, Set STATUS LED.
        CALL    HANGUP                  ;Make sure relays are deenergized.
        LD      LANG,#LANG0             ;Zero     (2/8)
        CLR     REPORT                  ;Zero
        CALL    SETTIME                 ;Initiallize the Timebase.
        CALL    CLRCLK                  ;And turn on the timers.
        LD      SYSTEM, #%CA            ;Load WARMSTART byte to ram.
        LDW     RR6, #VIRGIN
        LDE     @RR6,   SYSTEM NSF:    LD      SYSTEM, P2
        TM      SYSTEM, #LSENSE         ;Insure onhook before branch test.
        JR      NZ,NSF
        CALL    HANGUP                  ;Blink the yellow when onhook occurs.
;=================================================================;
; BEGIN IDLE OPERATION                                            ;
;=================================================================;
BRANCH:    LD   SYSTEM, P3              ;MAIN DECISION TREE AFTER WARMSTART.
        TM      SYSTEM, #RINGVAL        ;Since a ring can sometimes trip
        JP      NZ,RIGAIN               ;the line sense relay, the Dialtone
        LD      SYSTEM, P3              ;is used as the HOOK detector.
        TM      SYSTEM, #TONEVAL        ;
        JP      NZ,RUNMIU               ;
        JR      BRANCH
RIGAIN: LD      PTIME,  #%50
        CALL    PSDLY
        LD      SYSTEM, P3
        TM      SYSTEM, #RINGVAL
        JP      NZ,RUNPRG
        JR      BRANCH
;=================================================================;
; MAINLINE MIU CALL TABLE:                                        ;
;=================================================================;
RUNMIU: CALL    HALFDLY
        CALL    NUMBIN
        CALL    HALFDLY
        CALL    LDDLAY                  ;Softset timer for Linesense disable.
        CALL    DEFAULT
        CALL    BATTERY
        JP      PHRASE1                 ;"WOULD YOU LIKE TO LEAVE A MESSAGE?"
PHRZBAK:CALL    POUNDS                  ;POUND-KEY, TIMEOUT OR HANGUP TEST.
ACCEPT: JP      PHRASE2                 ;"ONE MOMENT PLEASE".
PHRZLNK:CALL    OFFHOOK                 ;ROUTINE WILL JUMP TO NOSALE IF USER
        CALL    HDELAY                  ;CHOOSES NOT TO USE THE SERVICE.
        CALL    DIALTON
        CALL    COAMP
        CALL    CALHOST
        CALL    COIN
        CALL    CPOUND                  ;Listen for host #
        CALL    SHIPAA                  ;Reply with 2 #'s
        CALL    SHIPAA                  ;
SHPREQ:    CALL SHPIDN                  ;Transmit IDN
        CALL    SHIPND                  ;Transmit #
        CALL    SHPLAN                  ;Transmit language code + #
        CALL    SHPUDN                  ;Transmit UDN
        CALL    SHIPND                  ;Transmit #
        CLR     SYSTEM                  ;Set flag for first pass.
        CALL    COPY?                   ;RETRANSMIT ONCE MORE IF NECESSARY.
RESHIP: CALL    DTMDLY
        CALL    DTMDLY
```

```
        CALL SHPIDN             ;Transmit IDN
        CALL SHIPND             ;Transmit #
        CALL SHPLAN             ;Transmit language code + #
        CALL SHPUDN             ;Transmit UDN
        CALL SHIPND             ;Transmit #
        CALL COPY?
,       ;EXIT this loop VIA COPY? test results.

;================================================================;
; PRIMARY PMODE CALL TABLE:                                      ;
;================================================================;
RUNPRG: CALL     INRING                  ;PROGRAMMING MODE IS ACTIVATED
        CALL     OFFHOOK                 ;AFTER INCOMING RINGS HAVE BEEN
        CALL COAMP              ;
        CALL HDELAY             ;
        CALL SHIPND             ;
        CALL LOCKIN             ;VERIFIED AND COUNTED. Then read in
        CALL PROGIN             ;software PMODE key and Command code.
        CALL RAMPASS            ;RAMPASS executes requested code-
        CALL DOCTOR             ;Report to Host.
;================================================================;
; NOSALE: COIN-RETURN SEQUENCES:                                 ;
;================================================================;
NOSALE: CLR      P3                      ;Safely simulates new offhook to
C.O.
        CALL     HANGUP                  ;for coin return voltage.
        CALL OFFHOOK            ;
        CALL DIALTON            ;
        CALL HANGUP             ;
        JP   RESTART            ;

CANCEL: CLR      P3                      ;Same as above but with error abort.
        CALL     HANGUP                  ;
        CALL OFFHOOK            ;
        CALL DIALTON            ;
        CALL.HANGUP             ;
        JP   TROUBLE            ;
;================================================================;
; USER DESTINATION LOADER/EVALUATOR:                             ;
;================================================================;
NUMBIN: LD  PTIME,#11 ;(T) ;DIGIT TIMEOUT VALUE FOR DESTINATION #.
        LD  DIGLIM,#04          ;Default (Variable) EOC marker.
        CLR WORKREG             ;Linesense disable flag. (OFF on 7th.)
        CLR GENFLG              ;Loop Count Index.
        CLR SYSTEM              ;WRR ACCUMULATOR FOR LENGTH TESTS.
        CALL P2IN          ;Typical LOADER setup.
        LDW RR6,#DIGIT1         ;Set up for destination address.
        CALL CEOF2                  ;Start the loader engine.
        CALL COMPARE            ;CHECK EXTBL AFTER FIRST 4 ARE LOADED.
        LDW RR6,#DIGIT1         ;PREDICT USER DESTINATION LENGTH BY
        LDE STWORD,   @RR6      ;EVALUATING FIRST FOUR DIGIT VALUES.
        CP  STWORD,   #%0D      ;Is first digit a ZERO?
        JP  EQ,RESTART          ;QUIT if it is.
        CP  STWORD,   #%00      ;Or is it a ONE?
        JR  EQ,SETFLG      ;Make a note if it is.
LTEST2: LDW RR6,#DIGIT3             ;Now testing the 3rd digit.
        LDE STWORD,   @RR6      ;From ram scratchpad.
        CP  STWORD,   #%0D      ;Again, is it a ZERO?
        JR  EQ,SETSIZ      ;Note the results.
        CP  STWORD,   #%00      ;Or a ONE in the 3rd digit?
,       JR  EQ,SETSIZ      ;Fall through this test if not.
SIZBACK:JR       CHECKL
NEWEOC: CLR GENFLG
        LDW RR6,#DIGIT5         ;RESUME LOADING.
        CALL CEOF2              ;Use engine to finish the load.
```

```
        LD      STWORD,   #POUND          ;Prepare EOC marker.
        LDE     @RR6,     STWORD          ;Set EOC in place behind last digit.
        ; * * * L.D. COMPARISON TEST GOES HERE * * *
NUMEXIT:RET     ;EXIT LOCATION FOR NUMBIN * * *
SETFLG: LD      SYSTEM,   #%01            ;Any marker will do.
        JR      LTEST2                    ;Back to routine.
SETSIZ: XOR     SYSTEM,   #%02            ;Test to see if flag was set 1st
pass.
        JR      SIZBACK
CHECKL: CP      SYSTEM,   #00             ;FLAG = 0?
        JR      EQ,SET7                   ;Add 3 to count. (4+3=7)
        CP      SYSTEM,   #01             ;FLAG = (BIN) 10?
        JR      EQ,SET8                   ;Add 4 to count (4+4=8)
        CP      SYSTEM,   #03             ;FLAG = (BIN) 11?
        JR      EQ,SET11                  ;Add 7 to count (4+7=11)
SET7:   LD      DIGLIM,   #03             ;THIS IS 2ND PASS EOC DEFAULT VALUE.
        LD      LDSECS,   #01             ;
        JR      NEWEOC                    ;
SET8:   LD      DIGLIM,   #04             ;
        LD      LDSECS,   #03             ;Also setting seconds flag for later
        JR      NEWEOC                    ;Linesense ignore.
SET11:  LD      DIGLIM,   #07             ;
        LD      LDSECS,   #03             ;
        JR      NEWEOC                    ;

;================================================================;
; LOCKIN: OWNER LOCK CODE EVALUATION ROUTINE:                    ;
;   Pass condition is determined if entered data successfully    ;
;   completes the gauntlet and returns to main routine. An in-   ;
;   completed pass results in an unconditional jump to DOCTOR.   ;
;================================================================;
LOCKIN: LD      REPORT,   #%0A            ;(9)=ABORT REPORTS ERROR TO HOST
                                          ;UNLESS CHANGED LATER BY MODIFIER.
        LD      PTIME,#%10                ;(T) ;Set time allowed for PCODE entry.
        CALL    PDATA                     ;Start combination lock tests here.

LOCK1:  CP      R13,#%0E                  ; # ?
        JP      NE,DOCTOR
        CALL    PDATA
LOCK2:  CP      R13,#%02                  ; 3 ?
        JP      NE,DOCTOR
        CALL    PDATA
LOCK3:  CP      R13,#%08                  ; 7 ?
        JP      NE,DOCTOR
        CALL    PDATA
LOCK4:  CP      R13,#%02                  ; 3 ?
        JP      NE,DOCTOR
        RET
;================================================================;
;; PROGIN: PROGRAM CODE CHANGE RECEIVER ROUTINE                  ;
; Uses time-sensitive DTMF-DV routine to trap and report any     ;
; erroneous PCODE entries. Error results in an unconditional     ;
; jump to DOCTOR reporting (HOST dump), routine.                 ;
;================================================================;
PROGIN: LD      PTIME,#%10                ;LOAD AND MODIFY PCODE
INSTRUCTIONS.
        CALL    PDATA                     ;Load first PCODE character.
        LD      R0, STWORD                ;Move data to temp reg. (RR0)
        CALL    PDATA                     ;Fetch second PCODE charactor.
        LD      R1, STWORD                ;To complete the RR set.
        LDW     RR6,#PCESYS               ;Prepare indirect move.
        LD      R14,#04                   ;Multiplier Value.
        MULT    RR14,R0                   ;Multiply 1st number times 4.
        ADD     SYSTEM,R1                 ;Add 2nd number to above product.
```

```
        LDE     @RR6,SYSTEM             ;Store sum of PCE numbers in the
        RET                             ;evaluation buffer.
;===============================================================;
; RAMPASS:  PCE CODE-TO-SUBROUTINE JUMPTABLE ROUTINE:           ;
;===============================================================;
RAMPASS:LDW     RR6,    #PCESYS
        LDE     SYSTEM, @RR6            ;Get Byte to examine.
        CP      SYSTEM, #%41            ;RBCNT
        JP      EQ,RBCNT
        CP      SYSTEM, #%34            ;INRCTR
        JP      EQ,INRCTR
        CP      SYSTEM, #%35            ;BILING
        JP      EQ,BILING
        CP      SYSTEM, #%36            ;ED2AH ;Enable/Disable 2nd HOST #.
        JP      EQ,ED2AH
        LD      REPORT, #%09
        CP      SYSTEM, #%0D            ;AH1L ;Alt Home #1.
        JP      EQ,AH1L
        CP      SYSTEM, #%00            ;UNIMPLEMENTED
        NOP
        CP      SYSTEM, #%01            ;STAID
        JP      EQ,STAID
        CP      SYSTEM, #%02            ;UNIMPLEMENTED
        NOP
        CP      SYSTEM, #%11            ;AHLD1 ;Alt Home #2.
        JP      EQ,AHLD1
        CP      SYSTEM, #%04            ;UNIMPLEMENTED
        NOP
        CP      SYSTEM, #%05            ;UNIMPLEMENTED
        NOP
        CP      SYSTEM, #%06            ;REMOTE SHUTDOWN
        JP      EQ,SHTDOWN
        LD      REPORT, #%09
        CP      SYSTEM, #%15            ;RDSTO ;Read System Registers
        JP      EQ,RDSTO
        CP      SYSTEM, #%08            ;Call home and report :(DOCTOR)
        JP      EQ,DOCTOR
        CP      SYSTEM, #%09
        NOP                             ;UNIMPLEMENTED
        CP      SYSTEM, #%0A            ;RDREG ;Dump All registers
        JP      EQ,RDREG
        RET
;===============================================================;
; SEQUENCE MONITORING/ERROR CONTROLS                            ;
;===============================================================;
MORE:       CALL CLRCLK                 ;CALLS DUMPING TO M2000 WHEN TIMED-
OUT.
        CALL DLOW               ;TESTING FOR FURTHER DTMF ACTIVITY.
PRDVH:  LD      DATAVD,   P2          ;This code looks for DTMFDV=HI for
        CP      SECOND, #10             ;(T) ;use with automatic HOST reporting,
        JP      EQ,DOCTOR               ;allowing for a n-sec. window.
        TM      DATAVD, #%(2)00010000   ;No other bits tested on the port.
        JR      Z,PRDVH                 ;Loop untill HI or timeout.

LD      SPH, #%00       ;Reset to avoid overflow from too
        LD      SPL, #%FF       ;many nested subroutine CALLs.
        NOP
        NOP
        NOP
        NOP
        NOP
        NOP
        CALL PROGIN                     ;This loop will continue untill a
        CALL RAMPASS                    ;timeout condition occurs.
```

```
        CALL DOCTOR                      ;REPORT: RAMPASS FINDS NO VALID PCODE.

COPY?:  CP    SYSTEM,#%00                ;LOOKS FOR RE-SHIP REQUEST FROM M/2000.
        JP    GT,TROUBLE                 ;BUT ONLY ALLOWS 2 ATTEMPTS TO SHIP.
        INC   SYSTEM                     ;2 FAILURES CONSTITUTE ALARM CONDITION.
        CALL  CLRCLK                     ;SYSTEM REG HOLDS PASSES-COUNTED.
COPYLP: CALL P2IN                        ;Begin tests for M/2000 response.
COPYHI: LD    DATAVD, P2                 ;NO DTMF activity in n-seconds will
        CP    SECOND, #10                ;set the ERROR flag, also.
        JP    EQ;TROUBLE                 ;
        TM    DATAVD, #%(2)00010000      ;
        JR    Z,COPYHI                   ;
        LD    STWORD, P2                 ;
        AND   STWORD, #%(2)00001111      ;
        CP    STWORD, #%08               ;Looking here for RXD-OK, (dec 7).
        JP    EQ,RESTART                 ;RXD-OK: Skip to RESTART.
        CP    STWORD, #STAR              ;Look for EOT from host as 2nd exit.
        JP    EQ,RESTART                 ;EOT received: RESTART.
        CP    STWORD, #%02               ;Look for RE-SHIP request, (dec 3).
        JP    RESHIP                     ;SHIP AGAIN IF HOST DIDN'T HEAR.
        JR    COPYLP                     ;Continue to recycle testing untill
        ;                                ;RTX-OK, *, Hangup, or Timeout.

OFFLINE:DI                               ;This routine aborts all relay and
        CLR   P3                         ;useable processor activity in the
        LD    P4,#%80                    ;event of a DTMF or LINE failure,
        CLR   ERRCNT                     ;setting THE ALARM AND AMBER LED.
OFFLOOP:JR    OFFLOOP                    ;

SHTDOWN:CLR   P3                         ;REMOTE DISABLE WITH WINK.
        CLR   P4                         ;STATUS & FAIL .5Hz
        CALL  HALFDLY
        XOR   P4,#%C0
        CALL  HALFDLY
        JR    SHTDOWN

ALERT:  LD    REPORT, #%0A               ;(9) SETS ERROR/FAULT CODE FOR HOST.
        RET
;==============================================================;
; PROGRAMMABLE REGISTER ROUTINES:                      ;
;==============================================================;
RBCNT:  CALL PDATA                       ;Load a one-byte number via DTMF.
        CALL  MATHIN                     ;Modify the byte to decimal.
        CP    R13, #9                    ;Testing for greater than 8.
        JP    UGT,    ALERT              ;Quit if so.
        LD    RBC,    STWORD             ;Move the new setting to its home reg.
        LDW   RR6, #REGRAM1              ;And copy it to battery-backup.
        LDE   @RR6,   STWORD             ;
        LD    REPORT, #%09               ;Report Register change.
        JP    MORE                       ;Done this move.

INRCTR: CALL  PDATA                      ;Load the new value in from DTMF.
        CALL MATHIN                      ;Modify the byte to decimal.
        CP    R13, #9                    ;Greater than 8?
        JP    UGT, ALERT                 ;Quit if it is.
        LD    INRC,   STWORD             ;Set the value.
        LDW   RR6, #REGRAM2              ;And copy it to battery-backup.
        LDE   @RR6,   STWORD             ;
        LD    REPORT, #%09               ;Report Register change.
        JP    MORE                       ;Done this move.

BILING: CALL  PDATA                      ;Load in the 1 or 0.
        CALL MATHIN
```

```
        CALL  TOGGLE                  ;Test for valid toggle value.
        LD    BIMODE,   STWORD        ;Set that register (mode-marker
only).
        LDW   RR6, #REGRAM3   ;And copy it to battery-backup.
        LDE   @RR6,     STWORD        ;
        LD    REPORT,   #%09          ;Report Register change.
        JP    MORE              ;Done this move.

ED2AH:  CALL  PDATA                   ;Load in the 1 or 0.
        CALL  MATHIN                  ;Modify it to decimal.
        CALL  TOGGLE                  ;Test for valid toggle value.
        LD    ALTERN,   STWORD        ;2nd Alt Home n enable/disable
marker.
        LDW   RR6, #REGRAM4   ;And copy it to battery-backup.
        LDE   @RR6,     STWORD            ;(Indirect).
        LD    REPORT,   #%09          ;Report Register change.
        JP    MORE              ;Done this move.
;================================================================;
; LOADER SETUP ROUTINES                                          ;
;================================================================;
AH1L:   DI                            ;LOAD NEW LOCAL HOST NUMBER (1).
        SRP   #%40              ;Set for 4th Row G-P Regs. (SRP% 64)
        LDW   RR6,#RMS1         ;Get Address of first digit.
        SRP   #00               ;
        CALL  SHIFT                   ;Move it to current RR Pair.
        CLR   GENFLG                  ;Setup Index Counter.
        LD    DIGLIM #11              ;Set EOC.
        JP    CEOF1                   ;Start engine. Ends at MORE.

AHLD1:  DI                            ;LOAD NEW L.D. HOST NUMBER (1).
        SRP   #%40              ;Set for 4th Row G-P Regs. (SRP% 64)
        LDW   RR6,#RMB1         ;Get Address of first digit.
        SRP   #00               ;
        CALL  SHIFT                   ;Move it to current RR Pair.
        CLR   GENFLG                  ;Setup Index Counter.
        LD    DIGLIM #11              ;Set EOC.
        JP    CEOF1                   ;Start engine. Ends at MORE.

STAID:  DI                            ;LOAD NEW STATION I.D. NUMBER.
        SRP   #%40              ;Set for 4th Row G-P Regs. (SRP% 64)
        LDW   RR6,#RID1         ;Get Address of first digit.
        SRP   #00               ;
        CALL  SHIFT                   ;Move it to current RR Pair.
        CLR   GENFLG                  ;Setup Index Counter.
        LD    DIGLIM #10              ;Set EOC.
        JP    CEOF1                   ;Start engine. Ends at MORE.
;================================================================;
; STRING INTERROGATORS:                                          ;
;================================================================;
RDSTO:  LD    PTIME,    #%80 ;(T) ;READ SYSTEM REGISTERS ONLY.
        LD    GENFLG,   #%50       ;Set pointer to first reg location.
        LD    DIGLIM,   #%57       ;Set EOC pointer. REGRAM 1 THRU 7.
REGO1:  LD    STWORD,   @GENFLG         ;Fetch the indirect register
contents.
        CALL  MATHOUT                 ;Convert the HEX to 2/8 for output.
        CALL  OUTPUT                  ;Send it.
        INC   GENFLG            .     ;Bump the pointer
        CP    GENFLG,   DIGLIM        ;Check for EOF.
        JP    NE,REGO1          ;Loop if not done.
        LD    REPORT,   #%09       ; (8) Report Interrogation to HOST.
        JP    MORE              ;Exit if so.

RDAHN:  DI                            ;READ ALL HOME NUMBER STRINGS.
        LD    PTIME,    #%80          ;Set Time delay multiplier.
```

```
        LD    DIGLIM,  #22            ;Set EOC pointer.
        CLR   GENFLG                  ;Prepare Index Counter.
        SRP   #%40                    ;Do it.
        LDW   RR6, #RMS1              ;Setup first number's address.
        SRP   #%00                    ;Restore Register Pointer(s).
        CALL  SHIFT                   ;Move address to Working Reg set.
        CALL  DDUMP                   ;Start the output engine.
        JP    MORE                    ;Exit.
;================================================================;
;, STANDARD MIU FUNCTIONS:                                       ;
;================================================================;
CALHOST:CP    ALTERN,#%01
        JR    EQ,ALTHOST
        DI                            ;SETS ENGINE FOR EOF DIAL TERMINATION.
        SRP   #%40                    ;Select 4th row register set.
        LDW   RR6, #RMS1              ;Setup first number's address.
        SRP   #%00                    ;Restore Register Pointer(s).
        CALL  SHIFT                   ;Move address to Working Reg set.
        CALL  ENGINE                  ;Start the output engine.
        RET                           ;Exit.

ALTHOST:DI                            ;SAME AS ABOVE: 2ND ALTERNATE HOST #.
        SRP   #%40                    ;Select 4th row register set.
        LDW   RR6, #RMB1              ;Setup first number's address.
        SRP   #%00                    ;Restore Register Pointer(s).
        CALL  SHIFT                   ;Move address to Working Reg set.
        CALL  ENGINE                  ;Start the output engine.
        RET                           ;Exit.

SHPIDN: DI                            ;SHIPS THE RESERVED STARTION ID #.
        SRP   #%40                    ;Select 4th row register set.
        LDW   RR6, #RID1              ;Setup first number's address.
        SRP   #%00                    ;Restore Register Pointer(s).
        CALL  SHIFT                   ;Move address to Working Reg set.
        CALL  ENGINE                  ;Start the output engine.
        RET                           ;Exit.

SHPUDN: DI                            ;SHIPS THE USER DESTINATION #.
        SRP   #%40                    ;from the UDN RAM-file. The file
        LDW   RR6, #DIGIT1            ;is indirectly fetched, byte by byte,
        SRP   #%00                    ;untill an EOC marker is found
        CALL  SHIFT                   ;within the data string: (#).
        CALL  ENGINE                  ;Therefore, only numeric data can be
        RET                           ;shipped in this fashion; 0-9

SHPRPT:                               ;INSERT REPORT CODE INTO STRING
DUMP.
        LD    STWORD,   REPORT        ;Setup value in report code
register.
        CALL  OUTPUT                  ;Ship it.
        LD    STWORD,  #POUND         ;Set up for a "#".
        CALL  OUTPUT                  ;Ship it, too:
        RET                           ;Then RET.

SHPLAN:                               ;INSERT LANGUAGE CODE INTO STRING.
        TM    P2,  #DLBIT             ;FLIP THE REPORT TO HOST IF REPORT
        JR    Z,FLIP                  ;MODIFIER BIT IS SET.
FLB:    LD    STWORD,   LANG          ;Setup value in language code register.
        CALL  REGMATH
        CALL  OUTPUT                  ;Ship it.
        LD    STWORD,  #POUND         ;Set up for a "#".
        CALL  OUTPUT                  ;Ship it, too:
        RET                           ;Then RET.
FLIP:   CALL LCNVRT
```

```
        JR      FLB

SHIPAA:                                 ;SHIP A SINGLE NON-STD. DTMF "A"
        LD      STWORD,     #%3             ;Set up to ship a "A".
        CALL    OUTPUT                  ;Ship it.
        RET                             ;RET to CALLer.

SHIPND:                                 ;SHIP A SINGLE DTMF "POUND".
        LD      STWORD,     #POUND          ;Set up to ship a "#".
        CALL    OUTPUT                  ;Ship it.
        RET                             ;RET to CALLer.
;================================================================;
; RDREG: DUMP ALL REGISTER DATA FROM RAM:                        ;
;================================================================;
RDREG:  LD      PTIME,      #%20 ;(T) ;Used  with other CALL routines.
        LD      GENFLG,     #%50        ;READ CONVERTED REGISTERS ONLY.
        LD      DIGLIM,     #%57        ;Set EOC pointer.
REGO2:  LD      STWORD,     @GENFLG         ;Fetch the indirect register
contents.
        CALL    MATHOUT                 ;Convert the HEX to 2/8 for output.
        CALL    OUTPUT                  ;Send it.
        INC     GENFLG                  ;Bump the pointer
        CP      GENFLG,     DIGLIM          ;Check for EOF but don't ship it.
        JR      NE,REGO2            ;Loop if not done.
        CALL    SHIPND                  ;Finish with a #.
        CALL    HANGUP                  ;
        JP      RESTART                 ;Terminates call when through.

DOCTOR: CALL    HANGUP                  ;CALL MESSAGER AND DUMP ALL
REGISTERS
        CALL    CLRCLK                  ;AUTOMATICALLY TERMINATES PMODE.
REORD:  CP      SECOND,     #05 ;(T) ;CO to recovery time before reorder.
        JR      NE,REORD            ;Closed loop real-time delay.
        CALL    COAMP                   ;Energize K4.
        CALL    OFEHOOK                 ;Energize K1, K2: (Off-Hook, C.O.)
        CALL    HDELAY                  ;Look for dialtone.
        CALL    DIALTON                 ;
        CALL    HDELAY                  ;
        CALL    CALHOST                 ;Dial up the host.
        CALL    COIN                ;Ground Start.
        CALL    HDELAY                  ;
        CALL    CVRING                  ;Check for ringback (LINE error test).
        CALL    CPOUND                  ;Listen for CO-side # from MESSAGER.
        CALL    SHIPND                  ;Respond with a #.
        CALL    SHIPND                  ;Again.
        CALL    SHPIDN                  ;Ship Station Identifier Number.
        CALL    SHIPND                  ;Field seperator.
        CALL    SHPRPT                  ;Generate and ship a report code + #.
        JP      RDREG                   ;Dump all regs if connect is made.
;                                   ;Exit is made from RDREG call term.
;================================================================;
; LOADER ENGINE 1    (START FROM JUMP)                           ;
;================================================================;
CEOF1:  CALL    PDATA                   ;Get the prepared data from P2.
        LDE     @RR6, STWORD            ;Deliver it to RAM.
        INCW    RR6                 ;Bump counters.
        INC     GENFLG                  ;
        CP      GENFLG, DIGLIM          ;Check for EOC.
        JR      NE, CEOF1           ;Loop if not true.
        LD      REPORT,     #%09        ;Report number change.
        JP      MORE                ;Exit if so.
;================================================================;
; LOADER ENGINE 2: (START FROM CALL)                             ;
;================================================================;
```

```
CEOF2:      CALL GDATA                  ;Get the prepared data from P2.
            LDE  @RR6, STWORD           ;Deliver it to RAM.
            INCW RR6                    ;Bump counters.
            INC  GENFLG                 ;
            CP   GENFLG, DIGLIM         ;Check for EOC.
            JR   NE, CEOF2              ;Loop if not true.
            CLR  GENFLG                 ;
            RET                         ;Exit if so.
;==================================================================;
; DATA  DUMPING  ENGINE                                            ;
;==================================================================;
DDUMP:      LDE  STWORD,  @RR6          ;Fetch the indirect from RAM.
            CALL OUTPUT                 ;Send it to DTMF.
            INCW RR6                    ;
            INC  GENFLG                 ;Bump Pointers: Index.
            CP   GENFLG,  DIGLIM        ;
            JR   NE, DDUMP              ;Loop untill Done,
            RET                         ;Exit when so.
;==================================================================;
; DATA  OUTPUT  ENGINE                                             ;
;==================================================================;
ENGINE:                                 ;ROUTINE EXITS WHEN EOC IS
ENCOUNTERED.
            LDE  STWORD,   @RR6         ;Fetch the indirect from RAM.
            CP   STWORD,   #POUND       ;See if DATA is an EOC mark.
            JR   EQ,ENGDON              ;Quit if it is.
            CALL OUTPUT                 ;Send it to DTMF.
            INCW RR6                    ;Bump count.
            JR   ENGINE                 ;Loop untill Done,
ENGDON:     RET                         ;Exit when so.

;==================================================================;
; INPUT/OUTPUT UTILLITY SUBROUTINES:                               ;
;==================================================================;
GDATA:      CALL DHIGH                  ;Loads one nibble from DTMF.
            LD   STWORD,   P2           ;Data are returned in STWORD (R13).
            AND  STWORD,#%(2)00001111   ;Strip off the MSB.
            CALL DLOW                   ;Returns to CALLer only after a
            RET                         ;valid DTMF pause is encountered.

PDATA:      CALL PGIGH                  ;SAME AS ABOVE, BUT USED ONLY BY
FAIL-
            LD   STWORD,   P2           ;REPORTING SUBROUTINES.
            AND  STWORD,#%(2)00001111   ;Strip off the MSB.
            CALL DLOW                   ;Returns to CALLer only after a
            RET                         ;valid DTMF pause is encountered.

OUTPUT:     CALL P2OUT                  ;Sends one byte to DTMF generator.
            LD   P2, STWORD             ;VIA R13
            CALL WINK                   ;Strobe the STATUS LED.
            CALL DTMDLY                 ;Followed by n-ms delay.
            LD   P2, #%(2)10000000      ;Then sends a DTMF pause of the
            CALL DTMDLY                 ;same duration.
            CALL WINK                   ;Flip the STATUS again.
            RET                         ;And go back to CALLer.

DHIGH:      CALL P2IN                   ;Insure port setup at all times.
            CALL CLRCLK                 ;Resets timer each invocation.
DJDVH:      INC    WORKREG
            CP   WORKREG,#%07
            JR   EQ,SKPCAM
            CALL CAM
SKPCAM:     LD   DATAVD,   P2           ;This code looks for DTMFDV=HI for
            CP   SECOND, PTIME          ;use with general data-loading jobs,
```

```
        JP      EQ,RESTART              ;allowing for a n-sec. window.
        TM      DATAVD,   #%(2)00010000 ;No other bits tested on the port.
        JR      Z,DJDVH                 ;Loop untill HI or timeout.
        RET PGIGH:  CALL P2IN                       ;Insure port setup at all times.
        CALL CLRCLK                     ;Resets timer each invocation.
PGDVH:  LD      DATAVD,   P2            ;This code looks for DTMFDV=HI for
        CP      SECOND,   #06  ;(T)     ;use with PROGRAM data-loading jobs,
        JP      EQ,DOCTOR               ;EVENT FAILURE CALLS DOCTOR ROUTINE.
        TM      DATAVD,   #%(2)00010000 ;No other bits tested on the port.
        JR      Z,PGDVH                 ;Loop untill HI or timeout.
        RET DLOW:   LD      DATAVD,   P2            ;Tests for DTMF pause at PORT 2.
        TM      DATAVD,   #%(2)00010000 ;No time test on low transitions.
        JR      NZ,DLOW                 ;Just loop until DV line is low.
        RET                             ;And RET.

SYMBOL: CP      STWORD,   #POUND        ;Tests for valid # or * in R13. Any
        JR      EQ,SYMOK                ;other bit-pattern results in an
        CP      STWORD,   #STAR         ;unconditional RESTART.
        JR      EQ,SYMOK                ;Useful as a Tampering trap to dis-
        JP      RESTART                 ;courage hackers.
SYMOK:  RET                             ;Returns to CALL (pc+1) if passed.

TOGGLE: CP      STWORD,   #%0D          ;Tests for valid 0 or 1 in R13. Any
        JR      EQ,TOGOK                ;other bit-pattern results in an
        CP      STWORD,   #%01          ;unconditional ERROR call to HOST.
        JR      EQ,TOGOK                ;Useful as a Tampering trap to dis-
        LD      REPORT,   #%0A          ;courage hackers.
        CALL DOCTOR                     ;
TOGOK:  RET                             ;Returns to CALL (pc+1) if passed.

SHIFT:  LD      R6,70                   ;Moves address to current RR6 pair.
        LD      R7,71                   ;High byte, then Low byte, from
        RET                             ;G-P regs., 4th row.

;================================================================;

; LINE MONITOR ROUTINES:                        ;
;================================================================;
INRING: CLR GENFLG                      ;Use as index counter.
RCLOP1: CALL HRING                      ;Look for valid ring-high and a
        INC GENFLG                      ;Valid ring-low
        CP  GENFLG,  INRC               ;before bumping the counter.
        JR  NE,RCLOP1                   ;Check for all rings counted, and
        RET                             ;return to CALLing routine.

RINGBK: CLR GENFLG                      ;This routine is
RCLOP2: CALL VRING                      ;identical to above, except
        INC GENFLG                      ;it tests the index against
        CP  GENFLG,  RBC                ;a different EOC marker.
        JR  NE,RCLOP2                   ;
        RET                             ;...And RET.

VRING:  CALL P2IN                       ;Ring count/cycling routine for
        CALL CLRCLK                     ;above two routines.

RHI:    LD   STWORD,  P3                ;An unconditional jump to RESTART
        CP   SECOND,  #05  ;(T)         ;will occur if the ring signal
        JP   EQ,RESTART                 ;fails to reappear in n-seconds
```

```
        TM      STWORD,   #RINGVAL    ;for ANY reason other than EOC.
        JR      Z,RHI                 ;This loop also checks for a valid
RLOW:                                 ;ONHOOK condition as well as a
        LD      STWORD,   P3          ;low ring cycle before returning
        TM      STWORD,   #RINGVAL    ;to the CALLing routine.
        JR      NZ, RLOW              ;Therefore, only complete "Ring cycle
        RET                           ;-High" is counted as valid.

HRING:  CALL P2IN                     ;Ring count/cycling routine for
        CALL CLRCLK                   ;above HRING routine.
HHI:    LD      STWORD,   P3          ;An unconditional jump to RESTART
        CP      SECOND,   #08  ;(T)   ;will occur if the ring signal
        JP      EQ,RESTART            ;fails to reappear in n-seconds
        TM      STWORD,   #RINGVAL    ;for ANY reason other than EOC.
        JR      Z,HHI                 ;This routine does NOT look for a
HLOW:   LD      STWORD,   P3          ;ONHOOK-OFFHOOK condition as the
        TM      STWORD,   #RINGVAL    ;ring counters above.
        JR      NZ, HLOW              ;
        RET                           ;

CVRING: CALL P2IN                     ;Ring validator, line test for C.O.
        CALL CLRCLK                   ;
RNHI:   LD      STWORD,   P2          ;We may   see a # first on a fast
C.O.
        TM      DATAVD,   #%(2)00010000 ;so exit on any DTMF activity.
        JR      CVOUT                 ;
        LD      STWORD,   P3          ;An unconditional jump to TROUBLE
        CP      SECOND,   #10  ;(T)   ;will occur if Timeout comes before
        JP      EQ,CANCEL             ;one ringback from CO, for any reason
        TM      STWORD,   #RINGVAL    ;other valid ring.
        JR      EQ,RNHI               ;
CVOUT:  RET                           ;

DEFAULT:CALL    P2IN                  ;This routine looks for any
        CALL CLRCLK                   ;Additional coinage as in a L.D. call
ANSCON: TM      P3,       #COINZ      ;also buys the user more time.
        JR      NZ,CLRDEFT            ;
CLRDRET:CP      SECOND,   #15  ;(T)   ;
        JP      EQ,RESTART            ;
        LD      STWORD,   P3          ;condition of default after
        TM      STWORD,   #BUSYVAL    ;user DN is evaluated and
        JR      NZ,LINKER             ;found to be valid.
        LD      STWORD,   P2          ;
        TM      STWORD,   #LSENSE     ;FOR THE SHORT-PULSES ON THE 2nd
        JR      Z,ONHTST              ;SET OF BOARDS.
ONHRET: LD      STWORD,   P3
        TM      STWORD,   #RINGVAL    ;First checking for a busy
        JP      NZ,ARING              ;then a ring. If a ring is
        JR      ANSCON                ;CALL to the ring counter,
ARING:  CALL RINGBK                   ;followed by a jump to the
LINKER: RET                           ;default-condition handler.

CLRDEFT:CALL    CLRCLK
        CALL CAM
        JR      CLRDRET
ONHTST: CALL HCAM
        JR      ONHRET

DIALTON:CALL    CLRCLK                ;
TONELP: CP      SECOND,   #06  ;(T)   ;Timeout fail test.
        JP      EQ,RESTART            ;Quit if no Dialtone in 8 seconds.
        LD      STWORD,   P3          ;A definate de-bounce period is
        TM      STWORD,   #TONEVAL    ;required on some CO's and immediately
        JR      Z,TONELP              ;following the MIU relay activity.
```

```
           RET                        ;RET upon valid; RESTART on failure.

CAM:  CALL P2IN                ;CALL ABORT MONITOR.
      LD   STWORD,   P2         ;Examine the loop-current pin.
      TM   STWORD,   #LSENSE    ;Still there?
      JP   Z,RESTART            ;No; The station's On-Hook.
           RET                  ;Yes, get back to work.

CAMM:                           ;USED ONLY AFTER LINE IS DEFAULTED.
      LD   STWORD,   P2         ;Examine the loop-current pin.
      TM   STWORD,   #LSENSE    ;Still there?
      JP   Z,NOSALE             ;No; Maybe a reset/refund condition.
           RET                  ;Yes.

PCAMM: LD        STWORD,    P2       ;CALL ABORT TEST FOR PHRASES ONLY!
       TM   STWORD,   #LSENSE        ;If linesense is appears onhook for
       JR   NZ,NOCAMM          ;two consecutive phrase blocks, then
       INC  POLICE             ;consider valid. Otherwise clear.
       CP   POLICE,   #%02
       JP   GE,NOSALE
       RET
NOCAMM:  CLR  POLICE
       RET

HCAM:      CALL HALFDLY
      TM   P2,#LSENSE
      JP   Z,RESTART
      RET

;================================================================;
; DETECT FUNCTION-KEY SIGNALS:                                   ;
;================================================================;
STARS:    LD   PTIME,#%15    ;(T) ;CO has n-seconds to respond,
STRL2:    CALL CAM           ;If user stays on the line.
      CALL GDATA             ;Wait in loop untill then.
      CP   STWORD,   #STAR       ;  * ?
      JP   NE,STRL2          ;No; Keep looking.
      RET                    ;Yes: Get back to main loop.

CSTARS:   LD   PTIME,#%15    ;(T) ;CO has n-seconds to respond,
      CALL P2IN              ;
STRLP:    LD   DATAVD,P2         ;TIMEOUT MAY NOT CONSTITUTE A DTMF-
      CP   SECOND,   PTIME   ;
      JP   EQ,RESTART        ;
      TM   DATAVD, #%(2)00010000   ;FAILURE.
      JR   Z,STRLP           ;
      LD   STWORD,P2         ;
      AND  STWORD,#%(2)00001111  ;
      CP   STWORD,   #STAR       ;  * ?
      JP   NE,STRLP          ;No; Keep looking.
      RET                    ;Yes: Get back to main loop.

POUNDS:   CALL    CLRCLK         ;STATION SIDE: Assumes K4 Bit=0.
POUL2:    CALL CAMM              ;Check line-clear every loop.
      CP   SECOND,   #15  ;(T) ;Exits on #, abort, or timeout.
      JP   EQ,NOSALE         ;
      LD   STWORD,P2         ;Wait in loop untill then
      AND  STWORD,   #%(2)00001111 ;
      CP   STWORD,   #POUND       ;  # ?
      JR   EQ,APPOUN
      JP   POUL2             ;No. Keep looking
APPOUN:   CALL DLOW              ;Don't respond too fast if true.
      RET                    ;Yes: Get back to main loop.
```

```
CPOUND: CALL    CLRCLK              ;C.O.SIDE. Assumes K4=1.
POULP:  CALL    P2IN                ;
        LD   DATAVD,   P2            ;
        CP   SECOND,   #%20          ;
        JP   EQ,NOHOST               ;
        TM   DATAVD,   #%(2)00010000 ;
        JR   Z,POULP                 ;
        LD       STWORD, P2          ;
        AND  STWORD,#%(2)00001111    ;FAILURE TERMINATES IN SETTING
ERROR!
        CP   STWORD,   #POUND        ; # from MESSAGER?
        JP   NE,POULP       ;No. Keep looking
        CALL DLOW           ;Don't respond too fast if true.
        RET                 ;Yes: Get back to main loop.
NOHOST: CALL CANCEL                  ;ABORT CONDITION NOSALE ROUTINE.
;==========================================================;
; VOICE PROMPT HANDLERS:                          ;
;==========================================================;
PHRASE1:DI                           ;SET-UP FOR PORT LOADERS THIS PHRZ.
TSTPHRZ:CALL    PULLIN               ;
        CALL PULLIN                  ;Linesense may see residual bouncing.
        CLR  SYSTEM                  ;Use the SYSTEM reg as window to coin
        CLR  POLICE                  ;interrupt routine.
        LD   P3,    #%80      ;Chose U3 Latch to talk.
        CP   BIMODE,    #%01         ;
        JR   NE,PHR0                 ;
        CP   LANG,#LANG0              ;
        JR   EQ,PHR0                 ;
        CP   LANG,#LANG1
        JR   EQ,PHR1

PHR0:   LDW  RR6, #LTABLE0   ;LOADING FROM THE SAME SOCKETS ANYWAY.
        JR   PHROK
PHR1:   LDW  RR6, #LTABLE1   ;Point to new loader table.
PHROK:  CALL SPROCED              ;Call in loaders.
        LD   P4,  CELL4      ;Restore relay at port and setup
        CLR  P3              ;latch first before re-enabling
        CALL PULLIN          ;interrupts.
        EI
        JP   PHRZBAK         ;RETURN TO CALL TABLE.

PHRASE2:DI                   ;DISCRETE SINGLE-PHRASE DRIVER
        CALL PULLIN          ;"ONE MOMENT PLEASE"
        LD   P3,  #%80       ;
        TM   P3,  #%(2)00000100
        JR   NZ,PHRASE2
        CP   LANG,#LANG0
        JR   EQ,PH200K
        CP   LANG,#LANG1
        JR   EQ,PH210K

PH200K: LDW RR6, #LTAB20
        LDE  WORKREG,@RR6    ;ENABLE THE MEMORY AND CS LINE.
        LD   P4,WORKREG
        CALL    SPGO         ;
        LD   P4,  CELL4      ;Restore relay at port and setup
        CLR  P3              ;latch first before re-enabling
        CALL PULLIN          ;interrupts.
        EI                   ;
        JP   PHRZLNK         ;RETURN TO CALL TABLE.

PH210K: LDW RR6, #LTAB21
        LDE  WORKREG,@RR6    ;ENABLE THE MEMORY AND CS LINE.
        LD   P4,WORKREG
```

```
         CALL    SPGO              ;
         LD      P4,  CELL4        ;Restore relay at port and setup
         CLR     P3                ;latch first before re-enabling
         CALL    PULLIN            ;interrupts.
         EI
         JP      PHRZLNK           ;RETURN TO CALL TABLE.

SPROCED: LDE     WORKREG,@RR6      ;Phrase block 1 + enable M20
         LDE     WORKREG,@RR6      ;
         CALL    SPGO              ;Excecute.
         LDE     WORKREG,@RR6      ;Phrase block 2 + enable M20
         CALL    SPGO              ;Excecute.
         LDE     WORKREG,@RR6      ;Phrase block 3 + enable M20
         CALL    SPGO              ;Excecute.
         LDE     WORKREG,@RR6      ;Phrase block 4 + enable M20
         CALL    SPGO              ;Excecute.
         LDE     WORKREG,@RR6      ;Phrase block 2 + enable M30
         CALL    SPGO              ;Excecute.
         LDE     WORKREG,@RR6      ;Phrase block 3 + enable M30
         CALL    SPGO              ;Excecute.
         LDE     WORKREG,@RR6      ;Phrase block 4 + enable M30
         CALL    SPGO              ;Excecute.
         RET SPGO:    LD      P4,  WORKREG      ;Prepare port.
         CALL    OKST              ;Signal speech processor to start.
         JR      OKTST             ;Watch for OKI done or DTMF or other.
SPGRET:  INCW    RR6               ;Bump Phrase pointers befor RETurning.
         RET                       ;

OKST:    XOR     P4,  #%C0         ;Fire the start pulse and work STATUS.
         CALL    DTMDLY            ;...for several milliseconds.
         XOR     P4,  #%80         ;Toggle it back off again.
         CALL    PCAMM             ;CHECK LINE EACH BUMP.
         RET                       ;

OKTST:   NOP                       ;LET BUSY GO HIGH FIRST.
         LD      DATAVD,  P2
         TM      DATAVD,  #%(2)00010000
         JR      NZ,PADTEST
PTRET:   LD      SYSTEM,  P3       ;the speech processor at Bit 3,
         TM      SYSTEM,  #%(2)00000100  ;Port 3.
         JR      NE,OKTST          ;Loop until low.
         JR      SPGRET            ;Jump back to SPGO.

PADTEST: LD      STWORD,  P2
         AND     STWORD,  #%(2)00001111
         CP      STWORD,  #POUND
         JP      EQ,ACPTED
         CP      STWORD,  #00      ;(1 KEY)
         JP      EQ,NEWLANG
         JR      PTRET
ACPTED:  CALL    DLOW
         CALL    HDELAY
         JP      ACCEPT

NEWLANG: CP      BIMODE,  #%01
         JR      NE,PTRET
         CALL    LCNVRT
CHGHOLD: TM      P3,  #%(2)00000100
         JR      NE, CHGHOLD
         JP      TSTPHRZ
;==============================================================;
; LINE CONTROLLER ROUTINES (K1, K2, K3, K4)                    ;
;==============================================================;
```

```
COAMP:   CLR  P3                ;Turns on K4 for CO Side DTMF.
         OR   P4,    #K4     ;
         OR   CELL4, #K4        ;MIRROR THE PORT.
         CALL PULLIN            ;Armature swing time delay.
         RET                ;

STAMP:   CLR  P3                ;Sets K4 for Station Side DTMF.
         CLR  P4             ;
         CLR  CELL4          ;
         CALL PULLIN         ;
         RET                 ;

BATTERY:CLR   P3                ;Energizes Station Battery.
         LD   P4,    #K1     ;
         LD   CELL4, #K1     ;
         CALL PULLIN         ;
         RET                 ;

COIN:    CLR  P3                ;Toggles Ground Start Relay.
         XOR  P4,    #K3       ;Send coinage pulse via K3.
         XOR  CELL4, #K3     ;
         CALL HDELAY           ;1.0s. FOR CANADIAN DMS-100
         XOR  P4,    #K3     ;
         XOR  CELL4, #K3     ;
         CALL PULLIN         ;
         RET                   ;RETurning to program.

OFFHOOK:CLR   P3                ;SELECT THE CORRECT LATCH.
         OR   P4,    #03       ;Answer an incoming call for PMODE
         OR   CELL4, #03        ;Or otherwise isolate Station from C.O.
         CALL PULLIN         ;
         RET                 ;

HANGUP:  CLR  P3                ;SELECT THE CORRECT LATCH.
         CLR  P4               ;Turn off all relays and
         OR   P4,    #FAIL     ;Flicker AMBER LED.
         CLR  CELL4          ;
         CALL PULLIN           ;before RETurning
         CLR  P4             ;
         RET                   ;to the CALLing routine.

;==============================================================;
;       * * *       GENERAL UTILITY SUBROUTINES     * * *   ;
;==============================================================;

;==============================================================;
; PORT 2/3 INPUT INITIALIZATION:                     ;
;==============================================================;
P2IN:                           ;Sets up DDR's and current
         LD  P2AM,    #%(2)10000000   ;option for DTMF inputs.
         LD  P2BM,    #%(2)00000000
         LD  P2CM,    #%(2)00000000   ;(WAS LSB's =1000
         LD  P2DM,    #%(2)10001000
         LD  P2AIP,   #%00     ;No external latching on
         LD  P2BIP,   #%00     ;interrupts.
         LD  P2,      #%(2)10000000  ;Bit 7=DTMF Read.
         CLR P3
         RET
;==============================================================;
; PORT 2/3 OUTPUT INITIALIZATION:                    ;
;==============================================================;
P2OUT:                          ;Sets up DDR's and current
         LD  P2AM,    #%(2)10001010  ;option for DTMF outputs.
         LD  P2BM,    #%(2)00001010 ;
```

```
        LD   P2CM,      #%(2)00000000  ;(WAS LSB's =1000
        LD   P2DM,      #%(2)00001000  ;
        LD   P2, #%(2)10000000  ; -
        CLR  P3                 ;
        RET                     ;
;================================================================;
; TIMEKEEPING AND DELAYS:                                        ;
;================================================================;
SETTIME:                ; SYSTEMS TIMEBASE INITIALLIZATION:
        LD   SYM,#00000000B ;Disable fast interrupt response.
        LD   IPR,#00000010B ;Set interrupt priority  register
                            ;for IRQ2: highest.
        LD   IMR,#00000100B ;Reenable IRQ2 only.
        SB1                 ;Select bank 1 registers.
        LD   COTCH,#^HB(40960)   ;High byte of time constant.
        LD   COTCL,#^LB(40960)   ;Low byte of time constant.
        LD   COM,#00000100B ;p27,37 is I/O, Prog-u/dn, capture-off,
                            ;timer mode set.
        SB0                 ;Select bank 0 registers.
        LD   COCT,#10100101B     ;Continuous, count down, load counter,
                                 ;0-count INT.enabled, enable counter.
        RET                 ;...And return initialization routine.

TIMER0:                 ; TIMEBASE INTERRUPT HANDLER:
        INC  PERIOD             ;Bump Period counter (120 Hz)
        CP   PERIOD,#120        ;One second yet?
        JR   NE,CYCLE   ;No. Reset counter INT.
        CLR  PERIOD             ;Yes. Wrap around Period register.
        INC  SECOND             ;Bump SECONDs register.
        XOR  P4,#%40            ;Toggle STATUS bit on analog board.
        CP   SECOND,#60         ;Test for 60 seconds EOC.
        JR   NE,CYCLE   ;No, Keep counting.
        CLR  SECOND             ;Yes. Restart the sequence.
CYCLE:  OR   COCT,#00000010B    ;Reset counter's EOC Interrupt bit.
        IRET                    ;Restore PC; Return.

CLRCLK: DI                      ; INTERRUPT CLOCK REGISTER RESET:
        CLR  SECOND             ;Reset timer's registers.
        CLR  PERIOD             ;
        EI                      ;Reenable the clock
        RET                     ;and RET.

PSDLY:  NOP
PSD:    LD   R1,#PTIME     ;Holds Loop Multiplier value.
DDLY1:  LD   R0,#%FF            ;Run thru this nested loop...
DDLY2:  NOP                     ;To kill some time...
        NOP                ;
        DJNZ R0,DDLY2      ;...Etc...
        DJNZ R1,DDLY1      ;
        CALL WINK          ;INT's maybe disabled.
        RET                ;And RET to whoever CALLed.

DTMDLY: NOP                     ;DTMF DELAY (PRESET)
DQQ:    LD   R1,#%94       ;Holds Loop Multiplier value.
DTQQ1:  LD   R0,#%FF            ;Run thru this nested loop...
DTQQ2:  NOP                     ;To kill some time...
        NOP                ;APPROX. 85 ms.
        DJNZ R0,DTQQ2      ;...Etc...
        DJNZ R1,DTQQ1      ;
        CALL WINK          ;INT's may be disabled.
        RET                ;And RET to whoever CALLed.

HDELAY: CALL CLRCLK             ;Standard 1 second timer.
HDL:    CP   SECOND, #01        ;Using the interrupt driver as
```

```
         JR    NE,HDL                  ;the timebase.
         RET                           ;And RET when done.

HALFDLY: CALL  CLRCLK                  ;Standard 1/2 second timer.
HFD:     CP    PERIOD, #60             ;Using the interrupt driver as
         JR    NE,HFD                  ;the timebase.
         RET                           ;And RET when done.

PULLIN:  LD    PTIME,    #%A0 ;(T) ;RELAY ARMATURE PULL-IN TIME DELAY.
         CALL  PSDLY                   ;APPROX 100ms. Also serves as general-
         RET                           ;purpose debounce and glitch filter.

LDDLAY:  CALL  CLRCLK                  ;Number of seconds is set by
LDDLP:   CP    SECOND,   LDSECS        ;calling routine.
         JR    NE,LDDLP                ;Do nothing but watch the SECONDs
         RET                           ;register and RET when satisfied.

WINK:    XOR   P4,#%40                 ;Flips STATUS LED during INT-
         RET                           ;disabled routines.
;=============================================================;
; MATH TABLES FOR DECIMAL REGISTER ENTRIES:                   ;
;=============================================================;
MATHIN:  CP    STWORD,#02              ;This routine converts input 2/8
         JR    ULE,ADDOUT              ;to HEX.
         CP    STWORD,#04              ;Selects a window between 2 and 6:
         JR    EQ,NOCON                ;values in the window are ignored, as
         CP    STWORD,#05              ;well as the Pound, Star, and the
         JR    EQ,NOCON                ;2/8 equiv. of Zero (0D).
         CP    STWORD,#06              ;
         JR    EQ,NOCON                ;
         CP    STWORD,   #STAR         ;Insures NO conversion of
delimiters,
         JR    EQ,NOCON                ;field-seperators, or ZERO; (0D).
         CP    STWORD,   #POUND        ;
         JR    EQ,NOCON                ;
         CP    STWORD,   #%0D          ;
         JR    EQ,NOCON                ;Numbers above 8 are likewise adjusted.
         CP    STWORD,#08              ;
         JR    UGE,SUBOUT              ;

MATHOUT: CP    STWORD,#03              ;This routine converts HEX
         JP    ULE,SUBOUT              ;back to DTMF 2/8 format.
         CP    STWORD,#04              ;Same as above, but in reverse, with
         JR    EQ,NOCON                ;a shift in the window to compensate
         CP    STWORD,#05              ;for the +1, -1 phenomenon in
         JR    EQ,NOCON                ;converting the 2/8 back to HEX.(Dec.)
         CP    STWORD,#06              ;
         JR    EQ,NOCON                ;
         CP    STWORD,   #STAR         ;Insures NO conversion of
delimiters,
         JR    EQ,NOCON                ;field-seperators, or ZERO; (0D).
         CP    STWORD,   #POUND        ;
         JR    EQ,NOCON                ;
         CP    STWORD,   #%0D          ;
         JR    EQ,NOCON                ;
         CP    STWORD,#07              ;
         JR    UGE,ADDOUT              ;

ADDOUT:  ADD   STWORD,#01              ;RETURN Windows for conversion
         RET                           ;routines.
NOCON:   RET                           ;
SUBOUT:  SUB   STWORD,#01              ;
         RET                           ;
```

```
LCNVRT:   CP    LANG,#LANG0
          JR    EQ,CNVRTA
          CP    LANG,#LANG1
          JR    EQ,CNVRTB
LCVBAK:   RET
CNVRTA:   LD    LANG,#LANG1
          RET
CNVRTB:   LD    LANG,#LANG0
          RET

REGMATH:CP      STWORD,#%00
          JR    EQ,EGMATA
          CP    STWORD,#%01
          JR    EQ,EGMATB
EGMATA:   LD    STWORD,#%0D
          RET
EGMATB:   LD    STWORD,#%00
          RET

;===========================================================;
; TEST/SCREEN EXCLUDED UDN TABLE                            ;
;===========================================================;
COMPARE:CALL    PREPX1              ;SET UPS FOR EXTBL's START
ADDRESSES.
SKIPSN:   LDW   RR6, #EXTBL1        ;
          CALL  MOVEX
          LDW   RR6, #EXTBL2
          CALL  MOVEX
          LDW   RR6, #EXTBL3
          CALL  MOVEX
          LDW   RR6, #EXTBL4
          CALL  MOVEX
          LDW   RR6, #EXTBL5
          CALL  MOVEX
          LDW   RR6, #EXTBL6
          CALL  MOVEX
          LDW   RR6, #EXTBL7
          CALL  MOVEX
          LDW   RR6, #EXTBL8
          CALL  MOVEX
          LDW   RR6, #EXTBL9
          CALL  MOVEX
          LDW   RR6, #EXTBLA
          CALL  MOVEX
          LDW   RR6, #EXTBLB
          CALL  MOVEX
          LDW   RR6, #EXTBLC
          CALL  MOVEX
          LDW   RR6, #EXTBLD
          CALL  MOVEX
          LDW   RR6, #EXTBLE
          CALL  MOVEX
          LDW   RR6, #EXTBLF
          CALL  MOVEX
          RET

PREPX1:   LD    GENFLG, #%10        ;2nd row regs for examination file.
          LDW   RR6, #DIGIT1        ;Fetch RAM DATA. (UDN)
PREPLP:   LDE   STWORD, @RR6        ;Pointed to by a WWREG.
          LD    @GENFLG, STWORD     ;SEND INDIRECTION TO REG SET 2.
          INCW  RR6                 ;
          INC   GENFLG              ;
          CP    GENFLG, #%15        ;Checking for EOC byte.
          JR    NE, PREPLP          ;Loop untill EOC appears.
          RET                       ;Done.
```

```
MOVEX:    CLR   DIGLIM                    ;EXTBL FILE LOADER SUBROUTINE.
          LD    GENFLG, #%20              ;Select 2rd register row.
MOVELP:   LDE   STWORD, @RR6              ;Point to file start from a WWReg pair.
          LD    @GENFLG, STWORD           ;SEND INDIRECTION TO REG SET 1.
          INCW  RR6
          INC   GENFLG                    ;Allow EOC to be installed, also.
          INC   DIGLIM                    ;Hold value up to EOC for COMP value.
          CP    STWORD, #POUND
          JR    NE, MOVELP                ;Fall thru loop when EXTBL is in place.
          CLR   GENFLG                    ;RESET TO ZERO FOR NEW INDEX JOB.
          DEC   DIGLIM                    ;Not testing the EOC byte.
RCOMP1:   CP    16,32                     ; CALLING THE COMPARE LOOPS INTO PLAY
          JR    NE,RCOMP2                 ;AFTER EACH SETUP, TESTING FOR MATCHES.
          INC   GENFLG                    ;IF MATCH SUM=DIGLIM, THEN RESTART.
RCOMP2:   CP    17,33
          JR    NE,RCOMP3
          INC   GENFLG
RCOMP3:   CP    18,34
          JR    NE,RCOMP4
          INC   GENFLG
RCOMP4:   CP    19,35
          JR    NE,RCOMP5
          INC   GENFLG
RCOMP5:   CP    20,36
          JR    NE,COMPDN
          INC   GENFLG COMPDN:   CP    GENFLG, DIGLIM            ;Index match length of table?
          JR    NE,CLEARX                 ;Yes. back to loader.
          JP    RESTART                   ;IGNORE THIS TRANSACTION ON MATCH.
CLEARX:   RET
          .END
```

Although the invention has been described and illustrated in detail, it should be appreciated that the same is by way of illustration and example only. The spirit and scope of the present invention are to be limited only by the terms of the appended claims.

We claim:

1. A line interface unit for controlling receipt and delivery of voice messages over a telephone system having a voice message facility connectible to at least one calling station and a called station via a central office, the calling station having tip and ring lines connected to the central office, comprising:
a first switch connected to the calling station in the tip and ring lines and a second switch connected to the central office in the tip and ring lines, each of the first and second switches having first and second positions and wherein signals on the tip and ring lines are connected directly between the calling station and the central office when each of the switches are in the first position;
a speed dial circuit for dialing the voice message facility;
a speech circuit for issuing a predetermined prompt to the caller at the calling station;
means for monitoring the tip and ring lines;
means connected to the monitoring means for detecting a predetermined condition at the called station upon call initiation to the called station, for detecting receipt of a first predetermined code from the calling station and for detecting receipt of a second predetermined code from the voice message facility;
control means connected to the detecting means and the first and second switches, the control means responsive to detecting of the predetermined condition for switching the first switch from its first position to its second position to connect the speech circuit to the calling station for issuing the prompt;
wherein after the prompt is issued the control means is responsive to receipt of the first predetermined code from the calling station for switching the second switch from its first position to its second position to connect the speed-dial circuit to the central office for dialing the voice message facility; and
wherein after dialing the voice message facility the control means is responsive to receipt of the second predetermined code from the voice message facility for switching the first and second switches from their respective second positions back to their respective first positions to connect the calling station to the voice message facility.

2. The line interface unit as described in claim 1 wherein the calling station is a paystation.

3. The line interface unit as described in claim 2 wherein the line interface unit further includes a third switch connected between the ring line and ground, the third switch connected to and controlled by the control means for generating a ground start after the voice message facility has been dialed by the speed-dial circuit.

4. The line interface unit as described in claim 1 wherein the monitoring means includes a calling station monitor circuit connected to the calling station and a central office monitor circuit connected to the central office.

5. The line interface unit as described in claim 1 wherein the detecting means comprise first and second dual tone multifreguency (DTMF) signal detector circuits.

6. The line interface unit as described in claim 5 wherein the first predetermined code is a standard DTMF signal and the second predetermined code is a standard or non standard dual tone multifreguency (DTMF) signal.

7. The line interface unit as described in claim 5 wherein the detecting means also comprise a call progress detector circuit and the predetermined condition at the called station is a busy/no answer condition.

8. The line interface unit as described in claim 1 wherein the control means transmits a predetermined data string to the voice message facility following connection of the calling station to the voice message facility.

9. The line interface unit as described in claim 8 wherein the predetermined data string includes standard or non-standard DTMF signaling.

10. The line interface unit as described in claim 1 wherein the control means performs automatic number identification following receipt of the first predetermined code from the calling station.

11. A line interface unit for controlling receipt and delivery of voice messages over a telephone system having a voice message facility connectible to at least on calling paystation and a called station via a central office, the calling paystation having tip and ring lines connected to the central office, comprising:
a first switch connected to the calling paystation in the tip and ring lines and a second switch connected to the central office in the tip and ring lines, each of the first and second switches having first and second positions and wherein signals on the tip and ring lines are connected directly between the calling paystation and the central office when each of the switches are in the first position;
a third switch connected between the ring line and ground for generating a ground start;
a speed dial circuit for dialing the voice message facility;
a speech circuit for issuing a predetermined prompt to the caller at the calling paystation;
means for monitoring the tip and ring lines;
means connected to the monitoring means for detecting a busy/no answer condition at the called paystation upon call initiation to the called station, for detecting receipt of a predetermined code from the calling paystation and for detecting receipt of a predetermined code from the voice message facility;
control means connected to the detecting means and the first, second and third switches, the control means responsive to detection of the busy/no answer condition for switching the first switch from its first position to its second position to connect the speech circuit to the calling paystation for issuing the prompt;
wherein after the prompt is issued the control means is responsive to receipt of the predetermined code from the calling paystation for switching the second switch from its first position to its second position to connect the speed-dial circuit to the central office for dialing the voice message facility;
wherein after the voice message facility has been dialed by the speed-dial circuit the control means activates the third switch to generate a ground start; and
wherein after the ground start the control means is responsive to receipt of the predetermined code from the voice message facility for switching the first and second switches from their respective second positions back to their respective first positions to connect the calling paystation to the voice message facility.

12. The line interface unit as described in claim 11 wherein the detecting means further includes means for counting coins inserted into the calling paystation.

13. The line interface unit as described in claim 12 wherein the detecting means comprise;
first and second DTMF detector circuits; and
switch means controlled by the control means for selectively switching signals output from the first and second DTMF detector circuits to the control means.

14. The line interface unit as described in claim 13 wherein the predetermined code from the calling station is a standard DTMF signal and the predetermined code from the voice message facility is a non standard DTMF signal.

15. A line interface unit for controlling receipt and delivery of voice messages over a telephone system having a voice message facility connectible to at least one calling station and a called station via a central office, the calling station having tip and ring lines connected to the central office, comprising:
a first switch connected to the calling station in the tip and ring lines and a second switch connected to the central office in the tip and ring lines, each of the first and second switches having first and second positions and wherein signals on the tip and ring lines are connected directly between the calling station and the central office when each of the switches are in the first position;
a speed dial circuit for dialing the voice message facility;
a speech circuit for issuing a predetermined prompt to the caller at the calling station;
means for monitoring the tip and ring lines;
means connected to the monitoring means for detecting a predetermined condition at the called station upon call initiation to the called station, for detecting receipt of a first predetermined code from the calling station and for detecting receipt of a second predetermined code from the voice message facility;
control means connected to the detecting means and the first and second switches, the control means responsive to the predetermined condition for switching the first and second switches from their respective first positions to their respective second positions to connect the speech circuit to the calling station for issuing the prompt while simultaneously enabling the caller at the calling station to continue to monitor the progress of the call;
wherein after the prompt is issued the control means is responsive to receipt of the first predetermined code from the calling station for switching the second switch from its second position to its first position and then back to its second position to connect the speed dial circuit to the central office for dialing the voice message facility; and wherein after dialing the voice message facility the control means is responsive to receipt of the second predetermined code from the voice message facility for switching the first and second switches from their respective second positions back to their respective first positions to connect the calling station to the voice message facility.

16. A line interface unit for controlling receipt and delivery of voice messages over a telephone system having a voice message facility connectible to at least one calling paystation and a called station via a central office, the calling paystation having tip and ring lines connected to the central office, comprising:

a first switch connected to the calling paystation in the tip and ring lines and a second switch connected to the central office in the tip and ring lines, each of the first and second switches having first and second positions and wherein signals on the tip and ring lines are connected directly between the calling paystation and the central office when each of the switches are in the first position;

a third switch connected between the ring line and ground for generating a ground start;

a speed-dial circuit for dialing the voice message facility;

a speech circuit for issuing a predetermined prompt to the caller at the calling paystation;

means for monitoring the tip and ring lines;

means connected to the detecting means for detecting a busy/no answer condition at the called paystation upon call initiation to the called station, for detecting receipt of a predetermined code from the calling paystation and for detecting receipt of a predetermined code from the voice message facility;

control means connected to the detecting means and the first, second and third switches, the control means responsive to the busy/no answer condition for switching the first switch from its first position to its second position to connect the speech circuit to the calling paystation for issuing the prompt;

wherein after the prompt is issued the control means is responsive to the calling station going on hook for switching the second switch from its first position to its second position to reorder dialtone from the central office, and for thereafter switching the first switch from its second position back to its first position; and wherein the control means is responsive to receipt of dialtone from the central office for switching the second switch from its second position back to its first position to cause the central office to issue a coin return signal to the calling station.

17. The line interface unit as described in claim 1 wherein the first predetermined code from the calling station indicates that the caller desires to leave a voice message for the called station at the caller's expense.

18. The line interface unit as described in claim 17 wherein the telephone system further includes a call accounting unit connected to the voice message facility for recording an indication that the caller desires to leave a voice message at the caller's expense to thereby enable a system operator to bill the calling station directly.

19. A line interface unit for controlling receipt and delivery of voice messages over a telephone system having a voice message facility connectible to at least one calling station and a called station via a central office, the calling station having tip and ring lines connected to the central office, comprising:

a first switch connected to the calling station in the tip and ring lines and a second switch connected to the central office in the tip and ring lines, each of the first and second switches having first and second positions and wherein signals on the tip and ring lines are connected directly between the calling station and the central office when each of the switches are in the first position;

means for signaling the voice message facility;

a speech circuit for issuing a predetermined prompt to the caller at the calling station;

means for monitoring the tip and ring lines;

means connected to the monitoring means for detecting a predetermined condition at the called station upon call initiation to the called station, for detecting receipt of a first predetermined code from the calling station indicating that the caller desires to leave a voice message for the called station at the caller's expense, and for detecting receipt of a second predetermined code from the voice message facility;

control means connected to the detecting means and the first and second switches, the control means responsive to detecting of the predetermined condition for switching the first switch from its first position to its second position to connect the speech circuit to the calling station for issuing the prompt;

wherein after the prompt is issued the control means is responsive to receipt of the first predetermined code from the calling station for switching the second switch from its first position to its second position to enable the signaling means to signal the voice message facility; and wherein after signaling the voice message facility the control means is responsive to receipt of the second predetermined code from the voice message facility for switching the first and second switches from their respective second positions back to their respective first positions to connect the calling station to the voice message facility.

20. A line interface unit for controlling receipt and delivery of voice messages over a telephone system having a voice message facility connectible to at least one calling paystation and a called station via a central office, the calling paystation having tip and ring lines connected to the central office, comprising:

a first switch connected to the calling paystation in the tip and ring lines and a second switch connected to the central office in the tip and ring lines, each of the first and second switches having first and second positions and wherein signals on the tip and ring lines are connected directly between the calling paystation and the central office when each of the switches are in the first position;

a third switch connected between the ring line and ground for generating a ground start;

means for signaling the voice message facility;

a speech circuit for issuing a predetermined prompt to the caller at the calling paystation;

means for monitoring the tip and ring lines;

means connected to the monitoring means for detecting a busy/no answer condition at the called paystation upon call initiation to the called station, for detecting receipt of a predetermined code from the calling paystation indicating that the caller desires to leave a voice message for the called station, and for detecting receipt of a predetermined code from the voice message facility;

control means connected to the detecting means and the first, second and third switch, the control means responsive to detection of the busy/no answer condition for switching the first switch from its first position to its second position to connect the speech circuit to the calling paystation for issuing the prompt;

wherein after the prompt is issued the control means is responsive to receipt of the predetermined code from the calling paystation for switching the second switch from its first position to its second position to enable the signaling means to signal the voice message facility;

wherein after the voice message facility has been signaled the control means activates the third switch to generate a ground start; and wherein after the ground start the control means is responsive to receipt of the predetermined code from the voice message facility for switching the first and second switches from their respective second positions back to their respective first positions to connect the calling paystation to the voice message facility.

21. A line interface unit for controlling receipt and delivery of voice messages over a telephone system having a voice message facility connectible to at least one calling station and a called station via a central office, the calling station having tip and ring lines connected to the central office, comprising:

a first switch connected to the calling station in the tip and ring lines and a second switch connected to the central office in the tip and ring lines, each of the first and second switches having first and second positions and wherein signals on the tip and ring lines are connected directly between the calling station and the central office when each of the switches are in the first position;

means for signaling the voice message facility;

a speech circuit for issuing a predetermined prompt to the caller at the calling station;

means for monitoring the tip and ring lines;

means connected to the monitoring means for detecting a predetermined condition at the called station upon call initiation to the called station, for detecting receipt of a first predetermined code from the calling station and for detecting receipt of a second predetermined code from the voice message facility;

control means connected to the detecting means and the first and second switches, the control means responsive to the predetermined condition for switching the first and second switches from their respective first positions to their respective second positions to connect the speech circuit to the calling station for issuing the prompt while simultaneously enabling the caller at the calling station to continue to monitor the progress of the call;

wherein after the prompt is issued the control means is responsive to receipt of the first predetermined code from the calling station for switching the second switch from its second position to its first position and then back to its second position to enable the signaling means to signal the voice message facility; and wherein after the voice message facility has been signaled the control means is responsive to receipt of the second predetermined code from the voice message facility for switching the first and second switches from their respective second positions back to their respective first positions to connect the calling station to the voice message facility.

22. A line interface unit for controlling receipt and delivery of voice messages over a telephone system having a voice message facility connectible to at least one calling station and a called station via a central office, the calling station having tip and ring lines connected to the central office, comprising:

a switch connected to the central office in the tip and ring lines, the switch having first and second positions and wherein signals on the tip and ring lines are connected directly between the calling station and the central office when the switch is in the first position;

means for signaling the voice message facility;

means for monitoring the tip and ring lines;

means connected to the monitoring means for detecting a predetermined condition at the called station upon call initiation to the called station, for detecting receipt of a first predetermined code from the calling station indicating that the caller desires to leave a voice message for the called station at the caller's expense, and for detecting receipt of a second predetermined code from the voice message facility;

control means connected to the detecting means and the switch, the control means responsive to receipt of the first predetermined code from the calling station for switching the switch from its first position to its second position to enable the signaling means to signal the voice message facility; and wherein after signaling the voice message facility the control means is responsive to receipt of the second predetermined code from the voice message facility for switching the switch from its second position back to its first position to connect the calling station to the voice facility.

* * * * *